(12) United States Patent
Thyssen

(10) Patent No.: US 9,065,895 B2
(45) Date of Patent: Jun. 23, 2015

(54) NON-LINEAR ECHO CANCELLATION

(71) Applicant: Broadcom Corporation, Irvine, CA (US)

(72) Inventor: Jes Thyssen, San Juan Capistrano, CA (US)

(73) Assignee: Broadcom Corporation, Irvine, CA (US)

( * ) Notice: Subject to any disclaimer, the term of this patent is extended or adjusted under 35 U.S.C. 154(b) by 345 days.

(21) Appl. No.: 13/623,468

(22) Filed: Sep. 20, 2012

(65) Prior Publication Data

US 2013/0216056 A1    Aug. 22, 2013

Related U.S. Application Data

(60) Provisional application No. 61/672,615, filed on Jul. 17, 2012, provisional application No. 61/601,986, filed on Feb. 22, 2012.

(51) Int. Cl.
*H04B 3/20* (2006.01)
*H04M 9/08* (2006.01)

(52) U.S. Cl.
CPC ..................... *H04M 9/082* (2013.01)

(58) Field of Classification Search
None
See application file for complete search history.

(56) References Cited

U.S. PATENT DOCUMENTS

| | | | | |
|---|---|---|---|---|
| 5,121,426 A * | 6/1992 | Baumhauer et al. | ..... | 379/420.03 |
| 5,148,427 A * | 9/1992 | Buttle et al. | ..... | 370/291 |
| 5,263,020 A * | 11/1993 | Yatsuzuka et al. | ..... | 370/289 |
| 5,283,784 A * | 2/1994 | Genter | ..... | 370/288 |
| 5,319,585 A * | 6/1994 | Amrany | ..... | 708/322 |
| 5,323,458 A * | 6/1994 | Park et al. | ..... | 379/406.08 |
| 5,631,899 A * | 5/1997 | Duttweiler | ..... | 370/291 |
| 5,680,450 A * | 10/1997 | Dent et al. | ..... | 379/406.08 |
| 5,778,055 A * | 7/1998 | Paneth et al. | ..... | 379/93.31 |
| 5,818,945 A * | 10/1998 | Makino et al. | ..... | 381/66 |
| 6,147,979 A * | 11/2000 | Michel et al. | ..... | 370/292 |
| 6,249,581 B1 * | 6/2001 | Kok | ..... | 379/406.16 |
| 6,335,949 B1 * | 1/2002 | Kim | ..... | 375/232 |
| 6,546,099 B2 * | 4/2003 | Janse | ..... | 379/406.01 |
| 6,597,787 B1 * | 7/2003 | Lindgren et al. | ..... | 379/406.05 |
| 6,687,235 B1 * | 2/2004 | Chu | ..... | 370/286 |
| 6,813,311 B1 * | 11/2004 | Pal et al. | ..... | 375/219 |
| 7,027,592 B1 * | 4/2006 | Straussnigg et al. | ..... | 379/406.08 |
| 7,209,566 B2 * | 4/2007 | Griniasty | ..... | 381/59 |
| 7,558,729 B1 * | 7/2009 | Benyassine et al. | ..... | 704/226 |
| 7,672,445 B1 * | 3/2010 | Zhang et al. | ..... | 379/406.01 |
| 7,764,783 B1 * | 7/2010 | Pai et al. | ..... | 379/406.08 |
| 7,813,496 B2 * | 10/2010 | Kubin et al. | ..... | 379/406.02 |
| 7,813,498 B2 * | 10/2010 | Zhang et al. | ..... | 379/406.08 |

(Continued)

OTHER PUBLICATIONS

Mossi et al., "Robust and Low-Cost Cascaded Non-Linear Acoustic Echo Cancellation", ICASSP, Jul. 11, 2011, pp. 89-92.).*

(Continued)

*Primary Examiner* — Brenda Bernardi
(74) *Attorney, Agent, or Firm* — Fiala & Weaver P.L.L.C.

(57) ABSTRACT

A two-stage structure for performing non-linear echo cancellation is described in which a first echo canceller is used to attenuate linear echo components of a microphone signal and a second echo canceller is used to attenuate non-linear echo components of the output signal generated by the first echo canceller. One or both of the echo cancellers may be implemented using closed-form solutions, including a closed form solution for a hybrid method in the frequency domain.

20 Claims, 19 Drawing Sheets

(56) References Cited

U.S. PATENT DOCUMENTS

| | | | |
|---|---|---|---|
| 7,856,098 B1* | 12/2010 | Rossello | 379/406.12 |
| 7,881,460 B2* | 2/2011 | Looney et al. | 379/406.1 |
| 8,155,302 B2* | 4/2012 | Roovers | 379/406.05 |
| 8,175,871 B2* | 5/2012 | Wang et al. | 704/227 |
| 8,213,598 B2* | 7/2012 | Bendersky et al. | 379/406.14 |
| 8,279,912 B2* | 10/2012 | Dabiri et al. | 375/219 |
| 8,284,947 B2* | 10/2012 | Giesbrecht et al. | 381/66 |
| 8,340,317 B2* | 12/2012 | Pfaffinger et al. | 381/93 |
| 8,498,423 B2* | 7/2013 | Thaden et al. | 381/66 |
| 8,538,034 B2* | 9/2013 | Eriksson et al. | 381/66 |
| 2004/0076271 A1* | 4/2004 | Koistinen et al. | 379/88.11 |
| 2004/0264686 A1* | 12/2004 | Enzner | 379/406.08 |
| 2006/0147063 A1* | 7/2006 | Chen | 381/119 |
| 2006/0172781 A1* | 8/2006 | Mohebbi | 455/571 |
| 2006/0188089 A1* | 8/2006 | Diethorn et al. | 379/406.01 |
| 2006/0222172 A1* | 10/2006 | Chhetri et al. | 379/406.05 |
| 2007/0041575 A1* | 2/2007 | Alves et al. | 379/406.08 |
| 2007/0116255 A1* | 5/2007 | Derkx et al. | 379/406.08 |
| 2008/0085009 A1* | 4/2008 | Merks et al. | 381/66 |
| 2008/0219463 A1* | 9/2008 | Liu et al. | 381/66 |
| 2009/0310796 A1* | 12/2009 | Seydoux | 381/71.1 |
| 2010/0189274 A1* | 7/2010 | Thaden et al. | 381/66 |
| 2010/0310027 A1* | 12/2010 | Malladi et al. | 375/350 |
| 2011/0033059 A1* | 2/2011 | Bhaskar et al. | 381/71.4 |
| 2011/0093102 A1* | 4/2011 | Aichner et al. | 700/94 |
| 2011/0096942 A1* | 4/2011 | Thyssen | 381/94.1 |
| 2012/0237018 A1* | 9/2012 | Barron et al. | 379/406.08 |
| 2012/0250871 A1* | 10/2012 | Lu et al. | 381/66 |
| 2012/0250882 A1* | 10/2012 | Mohammad et al. | 381/94.1 |
| 2012/0308025 A1* | 12/2012 | Hendrix et al. | 381/71.11 |
| 2013/0163781 A1 | 6/2013 | Thyssen et al. | |
| 2013/0287216 A1* | 10/2013 | Eriksson et al. | 381/59 |
| 2014/0133649 A1* | 5/2014 | Lu et al. | 379/406.08 |

OTHER PUBLICATIONS

Nollett et al. "Nonlinear Echo Cancellation for Hands-Free Speakerphones", University of Illinois at Urbana-Champaign, 1997.*

* cited by examiner

SOLVING THE MATRIX EQUATION $$\begin{bmatrix} U_{0,0} & U_{0,1} & U_{0,2} & U_{0,3} \\ U_{1,0} & U_{1,1} & U_{1,2} & U_{1,3} \\ U_{2,0} & U_{2,1} & U_{2,2} & U_{2,3} \\ U_{3,0} & U_{3,1} & U_{3,2} & U_{3,3} \end{bmatrix} \cdot \begin{bmatrix} h_0 \\ h_1 \\ h_2 \\ h_3 \end{bmatrix} = \begin{bmatrix} v_0 \\ v_1 \\ v_2 \\ v_3 \end{bmatrix}$$

FIG. 16

Direct Form Solution to 4-tap ($3^{rd}$ Order) Hybrid
- No matrix structure (general solution)

$$\begin{bmatrix} U_{0,0} & U_{0,1} & U_{0,2} & U_{0,3} \\ U_{1,0} & U_{1,1} & U_{1,2} & U_{1,3} \\ U_{2,0} & U_{2,1} & U_{2,2} & U_{2,3} \\ U_{3,0} & U_{3,1} & U_{3,2} & U_{3,3} \end{bmatrix} \cdot \begin{bmatrix} h_0 \\ h_1 \\ h_2 \\ h_3 \end{bmatrix} = \begin{bmatrix} v_0 \\ v_1 \\ v_2 \\ v_3 \end{bmatrix}$$

$\Downarrow$ $a_0 = U_{3,3}U_{0,0}$
$a_1 = U_{2,2}U_{0,0}$
$a_2 = U_{2,3}U_{0,0}$
$a_3 = U_{3,2}U_{0,0}$
$p_0 = v_2 U_{3,3}$
$p_3 = v_0 U_{3,3}$
$p_4 = v_1 U_{3,3}$ $a_1 = U_{1,1}U_{3,3} - U_{3,1}U_{1,3}$
$a_2 = U_{1,0}U_{3,3} - U_{3,0}U_{1,3}$
$a_3 = U_{0,1}U_{3,3} - U_{3,1}U_{0,3}$
$t_0 = U_{2,2}U_{3,3} - U_{3,2}U_{2,3}$ $t_1 = U_{2,0}U_{3,3} - U_{3,0}U_{2,3}$
$t_2 = U_{2,1}U_{3,3} - U_{3,1}U_{2,3}$
$t_3 = U_{0,2}U_{3,3} - U_{3,2}U_{0,3}$
$t_4 = U_{1,2}U_{3,3} - U_{3,2}U_{1,3}$ $t_0 = U_{1,1}U_{0,0} - U_{0,1}U_{1,0}$
$t_1 = U_{1,3}U_{0,0} - U_{0,3}U_{1,0}$
$t_2 = U_{1,2}U_{0,0} - U_{0,2}U_{1,0}$
$t_3 = U_{3,1}U_{0,0} - U_{0,1}U_{3,0}$
$t_4 = U_{2,1}U_{0,0} - U_{0,1}U_{2,0}$
$p_0 = v_1 U_{0,0} - v_0 U_{1,0}$
$p_3 = v_3 U_{0,0} - v_0 U_{3,0}$
$p_4 = v_2 U_{0,0} - v_0 U_{2,0}$ $\Downarrow$ $invden_B = \dfrac{1}{(a_0 t_0 - t_1 t_3)(a_1 t_0 - t_2 t_4)(a_2 t_0 - t_1 t_4)(a_3 t_0 - t_2 t_3)}$ $num_1 = (a_0 t_0 - t_1 t_3)(p_4 t_0 - p_0 t_4) - (a_2 t_0 - t_1 t_4)(p_3 t_0 - p_0 t_3)$ $num_0 = (p_3 t_0 - p_0 t_3)(a_1 t_0 - t_2 t_4)(p_4 t_0 - p_0 t_4)(a_3 t_0 - t_2 t_3)$ $invden_A = \dfrac{1}{(a_0 t_0 - t_1 t_3)(a_1 t_0 - t_2 t_4)(a_2 t_0 - t_1 t_4)(a_3 t_0 - t_2 t_3)}$ $num_2 = (a_0 t_0 - t_1 t_3)(p_4 t_0 - p_0 t_4) - (a_2 t_0 - t_1 t_4)(p_3 t_0 - p_0 t_3)$ $num_3 = (p_3 t_0 - p_0 t_3)(a_1 t_0 - t_2 t_4)(p_4 t_0 - p_0 t_4)(a_3 t_0 - t_2 t_3)$ $\Uparrow$ $h_0 = invden_B \cdot num_0$
$h_1 = invden_B \cdot num_1$
$h_2 = invden_A \cdot num_2$
$h_3 = invden_A \cdot num_3$

FIG. 17

Direct Form Solution to 4-tap ($3^{rd}$ Order) Hybrid
- Hermitian matrix with real diagonal $$\begin{bmatrix} U_{0,0} & U_{0,1} & U_{0,2} & U_{0,3} \\ U_{0,1}^* & U_{1,1} & U_{1,2} & U_{1,3} \\ U_{0,2}^* & U_{1,2}^* & U_{2,2} & U_{2,3} \\ U_{0,3}^* & U_{1,3}^* & U_{2,3}^* & U_{3,3} \end{bmatrix} \begin{bmatrix} h_0 \\ h_1 \\ h_2 \\ h_3 \end{bmatrix} = \begin{bmatrix} v_0 \\ v_1 \\ v_2 \\ v_3 \end{bmatrix}$$

$$\Downarrow$$

$a_0 = U_{1,1}U_{3,3} - |U_{1,3}|^2 \quad t_0 = U_{2,2}U_{3,3} - |U_{2,3}|^2 \quad p_0 = v_2 U_{3,3}$ $a_1 = U_{1,0}U_{3,3} \quad U_{3,0}U_{1,3} \quad t_1 = U_{2,0}U_{3,3} \quad U_{3,0}U_{2,3} \quad p_3 = v_0 U_{3,3} \quad v_3 U_{0,3}$ $a_2 = U_{2,1}U_{3,3} \quad U_{3,1}U_{2,3} \quad t_2 = U_{2,1}U_{3,3} \quad U_{3,1}U_{2,3} \quad p_4 = v_1 U_{3,3} \quad v_3 U_{1,3}$ $$\Downarrow$$

$$invden_B = \frac{1}{(a_0 t_0 - |t_1|^2)(a_1 t_0 - p_0 t_2^*) - (a_2 t_0 - t_1 t_2^*)(p_3 t_0 - p_0 t_1^*)|^2 - |a_2 t_0 - t_1 t_2^*|^2}$$

$num_1 = (a_0 t_0 - |t_1|^2)(p_4 t_0 - p_0 t_2^*) - (a_2 t_0 - t_1 t_2^*)(p_3 t_0 - p_0 t_1^*)$ $num_0 = (p_3 t_0 - p_0 t_1^*)(a_1 t_0 - |t_2|^2) - (p_4 t_0 - p_0 t_2^*)(a_2 t_0 - t_1 t_2^*)^*$ $$\Uparrow$$

$t_0 = U_{1,1}U_{0,0} - |U_{0,1}|^2 \quad p_0 = v_1 U_{0,0} \quad v_0 U_{1,0}$ $t_1 = U_{1,3}U_{0,0} \quad U_{0,3}U_{1,0} \quad p_3 = v_3 U_{0,0} \quad v_0 U_{3,0}$ $t_2 = U_{1,2}U_{0,0} \quad U_{0,2}U_{1,0} \quad p_4 = v_2 U_{0,0} \quad v_0 U_{2,0}$ $$\Downarrow$$

$$invden_A = \frac{1}{(a_0 t_0 - |t_1|^2)(a_1 t_0 - |t_2|^2) - |a_2 t_0 - t_1 t_2^*|^2}$$

$num_2 = (a_0 t_0 - |t_1|^2)(p_4 t_0 - p_0 t_2^*) - (a_2 t_0 - t_1 t_2^*)(p_3 t_0 - p_0 t_1^*)^*$ $num_3 = (p_3 t_0 - p_0 t_1^*)(a_1 t_0 - |t_2|^2) - (p_4 t_0 - p_0 t_2^*)(a_2 t_0 - t_1 t_2^*)^*$ $$\Downarrow$$

$h_0 = invden_B \cdot num_0$ $h_1 = invden_B \cdot num_1$ $h_2 = invden_A \cdot num_2$ $h_3 = invden_A \cdot num_3$

FIG. 18

Direct Form Solution to 3-tap ($2^{nd}$ Order) Hybrid
- Hermitian matrix with real diagonal $$\begin{bmatrix} U_{0,0} & U_{0,1} & U_{0,2} \\ U_{0,1}^* & U_{1,1} & U_{1,2} \\ U_{0,2}^* & U_{1,2}^* & U_{2,2} \end{bmatrix} \begin{bmatrix} h_0 \\ h_1 \\ h_2 \end{bmatrix} = \begin{bmatrix} v_0 \\ v_1 \\ v_2 \end{bmatrix}$$

⇩

$$\begin{aligned}
a_0 &= U_{1,1}U_{0,0} - |U_{0,1}|^2 & a_3 &= U_{2,2}U_{1,1} - |U_{1,2}|^2 & p_0 &= v_1 U_{0,0} - v_0 U_{0,1}^* \\
a_1 &= U_{2,2}U_{0,0} - |U_{0,2}|^2 & a_4 &= U_{0,2}U_{1,2}^* - U_{0,1}U_{2,2} & p_1 &= v_2 U_{0,0} - v_0 U_{0,2}^* \\
a_2 &= U_{1,2}U_{0,0} - U_{0,2}U_{0,1}^* & a_5 &= U_{0,1}U_{1,2} - U_{0,2}U_{1,1}
\end{aligned}$$

⇩

$$\begin{aligned}
invden &= \frac{1}{a_0 a_1 - |a_2|^2} \\
num_2 &= p_1 a_0 - p_0 a_2^* \\
num_1 &= p_0 a_1 - p_1 a_2 \\
num_0 &= U_{0,0}(v_0 a_3 + v_1 a_4 + v_2 a_5)
\end{aligned} \qquad \begin{aligned} h_0 &= invden \cdot num_0 \\ h_1 &= invden \cdot num_1 \\ h_2 &= invden \cdot num_2 \end{aligned}$$

FIG. 19

NON-LINEAR ECHO CANCELLATION

CROSS-REFERENCE TO RELATED APPLICATIONS

This application claims the benefit of U.S. Provisional Patent Application No. 61/601,986, filed on Feb. 22, 2012, and U.S. Provisional Patent Application No. 61/672,615, filed on Jul. 17, 2012. Each of these applications is incorporated by reference herein in its entirety.

BACKGROUND

1. Technical Field

The subject matter described herein generally relates to systems and methods for performing echo cancellation in an audio communication system, such as a telephony system.

2. Description of Related Art

Acoustic echo is a phenomenon that occurs in audio communication systems, such as telephony systems, when speech generated by a remote or "far-end" speaker and played back over a local or "near-end" loudspeaker is picked up by a near-end microphone and transmitted back to the far end. The transmitted signal is a delayed version of the original, which causes the echo. The received far-end signal does not transfer directly from the loudspeaker to the microphone, but is subject to the environment in which the loudspeaker and microphone are located. This may include differing signal paths causing reverberation and spectral shaping. These effects are the transfer function between the loudspeaker and the microphone. Such transfer function is dynamic, as objects in the environment move or the loudspeaker and/or microphone change position.

Acoustic echo cancellation refers to a process by which the acoustic echo is modeled and then subtracted from the signal that is to be transmitted to the far end. Traditionally, acoustic echo cancellation is performed using an adaptive filter to estimate the transfer function between the loudspeaker and microphone. For such acoustic echo cancellers there is always a risk of divergence and the possibility of objectionable artifacts. Furthermore, for such acoustic cancellers, it is necessary to detect periods when the near-end and far-end speakers are talking simultaneously (a condition known as "double-talk") and to stop updating the adaptive filter during such periods to prevent divergence.

Many approaches to acoustic echo cancellation rely on the assumption that the echo path can be modeled by a linear filter. However, it is possible that certain components, such as the near-end loudspeaker and/or an amplifier associated therewith, will introduce non-linear distortions and thus the echo path must be modeled as a non-linear system. A non-linear system transfers energy from one frequency to other frequencies, and so the response will contain combinations of the input harmonics. To address this, acoustic echo cancellers have been developed that attempt to model non-linear distortions and remove them from the signal to be transmitted to the far end. However, such non-linear acoustic echo cancellers are typically exceedingly complex and therefore impractical to implement.

BRIEF DESCRIPTION OF THE DRAWINGS/FIGURES

The accompanying drawings, which are incorporated herein and form part of the specification, illustrate the subject matter of the present application and, together with the description, further serve to explain the principles of the embodiments described herein and to enable a person skilled in the relevant art(s) to make and use such embodiments.

Figure 1:
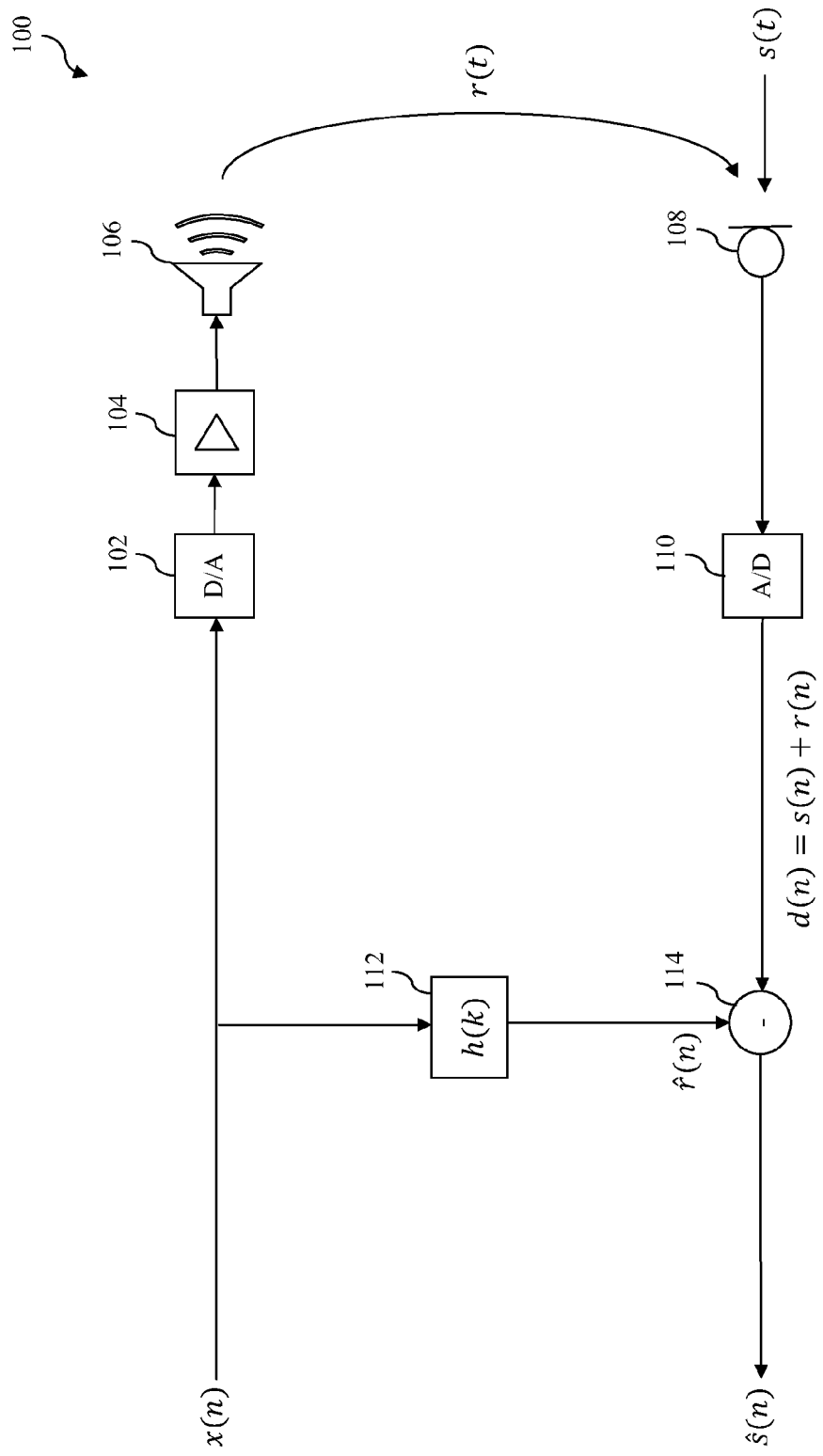
FIG. 1 is a block diagram of a system that illustrates the challenge of acoustic echo cancellation.

FIGS. 16-19 provide mathematic details for deriving closed-form solutions for hybrid frequency domain acoustic echo cancellers in accordance with certain embodiments.

The features and advantages of the subject matter of the present application will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

1. Introduction

The following detailed description discloses numerous example embodiments.

The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following sections, various systems and methods for performing acoustic echo cancellation will be described. Each of these systems and methods may be implemented as part of an audio communication system or device to help reduce or prevent the occurrence of acoustic echo. By way of example, the systems and methods described herein may be implemented in a desktop or mobile telephone, a computer-executable softphone, an audio teleconferencing system, or the like. More generally, the systems and methods described herein may be implemented in any audio communication system in which the occurrence of acoustic echo is possible.

The acoustic echo cancellation techniques described in the following sections are described as processing speech signals. However, persons skilled in the relevant art(s) will readily appreciate that all of the acoustic echo cancellation techniques described herein can also process music signals, and audio signals generally. Thus, any reference to a speech signal is not intended to be limiting. Where the term "speech signal" is used, the term "music signal" and "audio signal" may be used interchangeably.

Persons skilled in the relevant art(s) will also readily appreciate that the techniques described herein for performing acoustic echo cancellation may also be applied to attenuate or cancel other types of echo that may be present in an audio communication system. For example, such techniques may be applied to perform line echo cancellation in an audio communication system.

2. Systems for Performing Acoustic Echo Cancellation

A system that performs acoustic echo cancellation can be viewed as a multi-sensor-input, single-output system that operates to suppress in a signal produced by a microphone, a signal being played back by a loudspeaker and picked up as echo by the microphone. In this context, the sensor signals would be the microphone signal and the signal being played back by the loudspeaker.

2.1 Linear Acoustic Echo Cancellation

FIG. 1 is a block diagram of a system 100 that illustrates the challenge of acoustic echo cancellation. System 100 may be implemented, for example, in an audio communication system or device. As shown in FIG. 1, system 100 is operable to receive a far-end speech signal x(n). Far-end speech signal x(n) is converted from digital to analog form by a digital-to-analog (D/A) converter 102, amplified by an amplifier 104, and played back by a loudspeaker 106. As further shown in FIG. 1, a microphone 108 is operable to pick up the speech of a near-end speaker, represented as s(t), as well as an echo of the far-end speech being played back by loudspeaker 106, shown as r(t). The acoustic echo signal is subject to the acoustic environment and, as an example, is affected by the room impulse response. The signal captured by microphone 108 is passed to an analog-to-digital (A/D) converter 110, which converts it from analog to digital form. The output of A/D converter 110 is a microphone signal d(n), which is the sum of a near-end speech signal s(n) plus an acoustic echo signal r(n). As also shown in FIG. 1, far-end speech signal x(n) is also passed to a filter 112 having an impulse response h(k), which filters x(n) to produce an estimated acoustic echo signal $\hat{r}(n)$. Impulse response h(k) is intended to model the impulse response of the acoustic echo path between loudspeaker 106 and microphone 108. A combiner 114 subtracts estimated acoustic echo signal $\hat{r}(n)$ from microphone signal d(n), thereby producing an estimated near-end speech signal $\hat{s}(n)$. Estimated near-end speech signal $\hat{s}(n)$ may then be transmitted to another node in an audio communication system, such as a far-end audio communication system or device.

Figure 2:
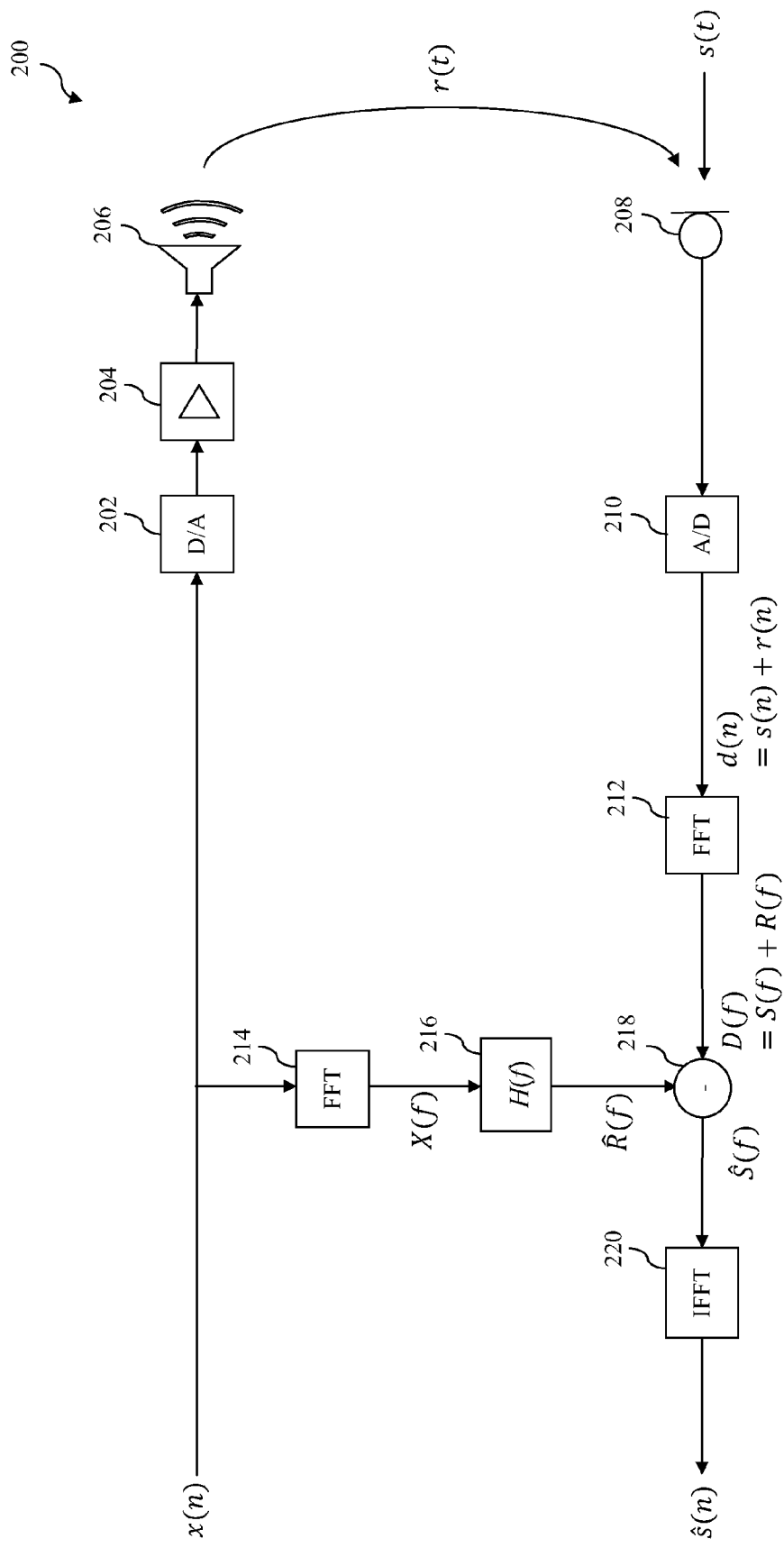
FIG. 2 is a block diagram of a system that is equivalent to the system shown in FIG. 1, but with certain operations now being performed in the frequency domain.

It is to be understood that the operations performed by the various components of system 100 are performed in the time domain. FIG. 2 is a block diagram of a system 200 that is essentially equivalent to system 100 of FIG. 1, but with certain operations now being performed in the frequency domain. As shown in FIG. 2, system 200 is operable to receive a far-end speech signal x(n). Far-end speech signal x(n) is converted from digital to analog form by a D/A converter 202, amplified by an amplifier 204, and played back by a loudspeaker 206. As further shown in FIG. 2, a microphone 208 is operable to pick up the speech of a near-end speaker, represented as s(t), as well as an echo of the far-end speech being played back by loudspeaker 206, shown as r(t). The acoustic echo signal is subject to the acoustic environment and, as an example, is affected by the room impulse response. The signal captured by microphone 208 is passed to an A/D converter 210, which converts it from analog to digital form. The output of A/D converter 210 is a microphone signal d(n), which is the sum of a near-end speech signal s(n) plus an acoustic echo signal r(n). Microphone signal d(n) is passed to a Fast Fourier Transform (FFT) component 212 that operates to produce a frequency domain representation of microphone signal d(n), which is shown as D(f). D(f) is the sum of a frequency domain representation of near-end speech signal s(n), which is shown as S(f), and a frequency domain representation of acoustic echo signal r(n), which is shown as R(f).

As also shown in FIG. 2, far-end speech signal x(n) is also passed to an FFT component 214 that operates to produce a frequency domain representation of x(n), which is shown as X(f). X(f) is passed to a filter 216 that carries out the filtering of X(f) in the frequency domain by multiplying X(f) by H(f) (which is a frequency domain representation of impulse response h(k)), thereby producing an estimated acoustic echo signal in the frequency domain, $\hat{R}(f)$. A combiner 218 subtracts estimated acoustic echo signal $\hat{R}(f)$ from microphone signal D(f), thereby producing an estimated near-end speech signal in the frequency domain, $\hat{S}(f)$. Estimated near-end speech signal $\hat{S}(f)$ is then passed to an Inverse Fast Fourier Transform (IFFT) component 220 that operates to produce a time domain representation of $\hat{S}(f)$, which is shown as $\hat{s}(n)$. Estimated near-end speech signal $\hat{s}(n)$ may then be transmitted to another node in an audio communication system, such as a far-end audio communication system or device.

In one embodiment, the FFT operations performed by FFT components 212 and 214 and the IFFT operations performed by IFFT component 220 are performed on a frame basis with suitable overlap and windowing for proper sampling of the spectrum in time.

2.1.1 Closed-Form Single-Tap Frequency Domain Solution

A closed-form solution can be derived in the time or frequency domain without loss of generalization. In the following, it is carried out in the frequency domain based on system 200 shown in FIG. 2. The objective is to minimize the output power of the acoustic echo canceller:

$$E_{\hat{S}} = E\{\hat{s}^2(n)\} \quad \text{(Eq. 1)}$$
$$\approx \sum_n \hat{s}^2(n)$$
$$= \sum_{m,f} \hat{S}(m,f) \cdot \hat{S}^*(m,f)$$

where n is the discrete time index, m is the frame index for the Discrete Fourier Transforms (DFTs), and f is the frequency index. The output is expanded as $$\hat{S}(m,f) = D(m,f) - \hat{R}(m,f) \quad \text{(Eq. 2)}$$
$$= D(m,f) - H(f) \cdot X(m,f)$$

Allowing the acoustic echo cancellation taps, $H_l(f)$, to be complex prevents taking the derivative with respect to the coefficients due to the complex conjugate (of $\hat{S}(m, f)$) not being differentiable. The complex conjugate does not satisfy the Cauchy-Riemann equations. However, since the cost function of Eq. 1 is real, the gradient can be calculated as $$\nabla(E_{\hat{S}}) = \frac{\partial E_{\hat{S}}}{\partial \text{Re}\{H_l(f)\}} + j \frac{\partial E_{\hat{S}}}{\partial \text{Im}\{H_l(f)\}}, l = 1, 2, \ldots M \quad \text{(Eq. 3)}$$

(see S. Haykin, "Adaptive Filter Theory," Prentice Hall, $2^{nd}$ edition, 1991, which is incorporated by reference herein). Hence, the gradient will be with respect to the complex tap for every frequency bin, H(f), is expanded as $$\nabla_{H(f)}(E_{\hat{S}}) = \frac{\partial E_{\hat{S}}}{\partial \text{Re}\{H(f)\}} + j \frac{\partial E_{\hat{S}}}{\partial \text{Im}\{H(f)\}} \quad \text{(Eq. 4)}$$
$$= \sum_m \hat{S}^*(m,f) \frac{\partial \hat{S}(m,f)}{\partial \text{Re}\{H(f)\}} + \hat{S}(m,f) \frac{\partial \hat{S}^*(m,f)}{\partial \text{Re}\{H(f)\}} +$$
$$j \sum_m \hat{S}^*(m,f) \frac{\partial \hat{S}(m,f)}{\partial \text{Im}\{H(f)\}} + \hat{S}(m,f) \frac{\partial \hat{S}^*(m,f)}{\partial \text{Im}\{H(f)\}}$$
$$= \sum_m -\hat{S}^*(m,f) X(m,f) - \hat{S}(m,f) X^*(m,f) +$$
$$j \sum_m -\hat{S}^*(m,f) jX(m,f) + \hat{S}(m,f) jX^*(m,f)$$
$$= -2 \sum_m \hat{S}(m,f) X^*(m,f)$$
$$= -2 \sum_m (D(m,f) - H(f) X(m,f)) X^*(m,f)$$
$$= 2H(f) \left\{ \sum_m X(m,f) X^*(m,f) \right\} - 2 \left\{ \sum_m D(m,f) X^*(m,f) \right\}$$
$$= 0$$

This solution can be written as $$H(f) = \frac{r_{D,X^*}(f)}{R_X(f)} \quad \text{(Eq. 5)}$$

where $$R_X(f) = \sum_m X(m,f) \cdot X^*(m,f) \quad \text{(Eq. 6)}$$

$$r_{D,X^*}(f) = \sum_m D(m,f) \cdot X^*(m,f) \quad \text{(Eq. 7)}$$

2.1.2 Hybrid Closed-Form Frequency Domain Solution

In the example solution derived in Section 2.1.1 (single-tap per frequency bin) the frequency resolution is determined by the FFT size. In many cases, this is a system compromise in the interest of overall complexity, and the FFT size may not provide adequate frequency resolution to perform satisfactory acoustic echo cancellation. This will generally be the case if the size of the FFT is smaller than the impulse response of the acoustic echo path. It may not be practical to have a separate larger size FFT (and IFFT) only for the acoustic echo cancellation. To address this issue, this section provides an alternative approach in the form of applying a time direction filter to individual frequency bins to incorporate longer memory into the model of the acoustic path. Effectively, the time direction filters in individual frequency bins increase the frequency resolution by providing a non-flat frequency response within a bin. This approach also enables the acoustic echo canceller to have a longer tail length than that otherwise provided by the size of the FFT, which is useful for environments having high reverberation and thus a longer impulse response.

Figure 3:
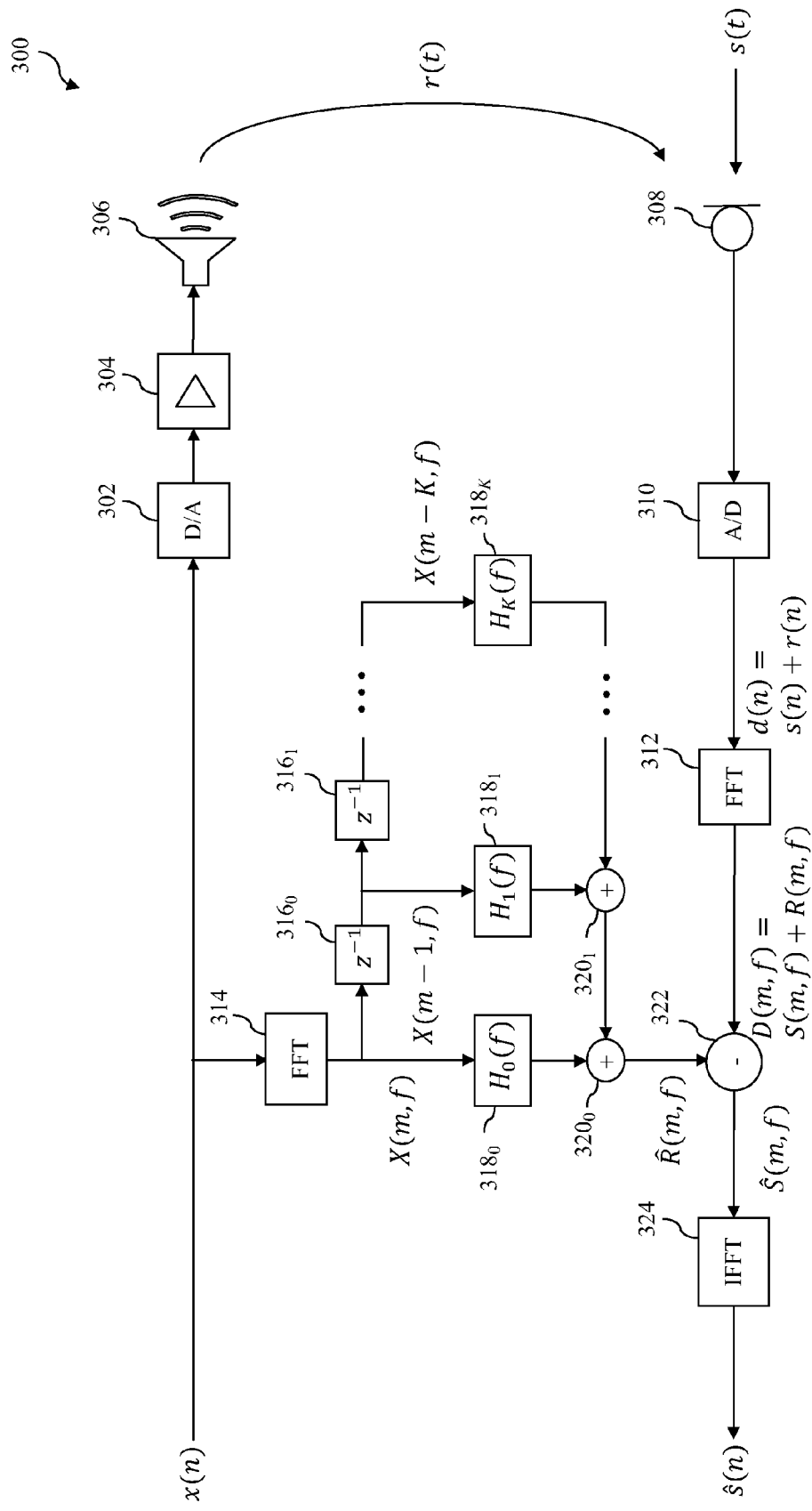
FIG. 3 is a block diagram of a system that performs acoustic echo cancellation using a hybrid frequency domain acoustic echo canceller.

FIG. 3 is a block diagram of a system 300 that performs acoustic echo cancellation using a hybrid frequency domain acoustic echo canceller. System 300 may be implemented, for example, in an audio communication system or device. In FIG. 3, the notion of time of the frequency representation has been introduced to all the spectra by the variable m which is the FFT frame index. The unit of the delay line is one frame—in other words, $z^{-1}$ means one frame or FFT sample delay.

As shown in FIG. 3, system 300 is operable to receive a far-end speech signal x(n). Far-end speech signal x(n) is converted from digital to analog form by a D/A converter 302, amplified by an amplifier 304, and played back by a loudspeaker 306. As further shown in FIG. 3, a microphone 308 is operable to pick up the speech of a near-end speaker, represented as s(t), as well as an echo of the far-end speech being played back by loudspeaker 306, shown as r(t). The acoustic echo signal is subject to the acoustic environment and, as an example, is affected by the room impulse response. The signal captured by microphone 308 is passed to an A/D converter 310, which converts it from analog to digital form. The output of A/D converter 310 is a microphone signal d(n), which is the sum of a near-end speech signal s(n) plus an acoustic echo signal r(n). Microphone signal d(n) is passed to an FFT component 312 that operates to produce a frequency domain representation of microphone signal d(n) for FFT frame m, which is shown as D(m, f). D(m, f) is the sum of a frequency domain representation of near-end speech signal s(n) for FFT frame m, which is shown as S(m, f), and a frequency domain representation of acoustic echo signal r(n) for FFT frame m, which is shown as R(m, f).

As also shown in FIG. 3, far-end speech signal x(n) is also passed to an FFT component 314 that operates to produce a frequency domain representation of x(n) for FFT frame m, which is shown as X(m, f). Each frequency sub-band or component of X(m, f) is passed through a corresponding time direction filter having a set of acoustic echo cancellation taps $H_0(f)$ through $H_K(f)$ (collectively denoted taps $318_0$ through $318_K$ in FIG. 3). A delay line comprising a plurality of delay elements $316_0$ through $316_{K-1}$ operates to produce the necessary time-delayed frequency components for each time direction filter. The outputs of taps $318_0$ through $318_K$ are summed by combiners $320_0$ through $320_{K-1}$ for each time direction filter, thereby producing an estimated acoustic echo signal in the frequency domain for FFT frame m, $\hat{R}(m, f)$. A combiner 322 subtracts $\hat{R}(m, f)$ from $D(m, f)$, thereby producing an estimated near-end speech signal in the frequency domain for FFT frame m, $\hat{S}(m, f)$. $\hat{S}(m, f)$ is then passed to an IFFT component 324 that operates to produce a time domain representation of $\hat{S}(m, f)$, which is shown as $\hat{s}(n)$. Estimated near-end speech signal $\hat{s}(n)$ may then be transmitted to another node in an audio communication system, such as a far-end audio communication system or device.

It should be noted that time direction filter order K can be frequency dependent so that the frequency resolution is not increased to the same extent in all frequency ranges.

The derivation of acoustic echo cancellation taps $H_0(f)$ through $H_K(f)$ will now be described. Again, the objective is to minimize the output power of the acoustic echo canceller:

$$E_{\hat{S}} = E\{\hat{s}^2(n)\} \quad \text{(Eq. 8)}$$
$$\approx \sum_n \hat{s}^2(n)$$
$$= \sum_m \sum_f \hat{S}(m, f) \hat{S}^*(m, f)$$

where n is the discrete time index, m is the frame index for the DFTs, and f is the frequency index. The output for a particular frequency bin is expanded as $$\hat{S}(m, f) = D(m, f) - \hat{R}(m, f) \quad \text{(Eq. 9)}$$
$$= D(m, f) - \sum_{l=0}^{K} H_l(f) \cdot X(m - l, f)$$

Allowing the acoustic echo cancellation taps, $H_l(f)$, to be complex prevents taking the derivative with respect to the coefficients due to the complex conjugate (of $\hat{S}(m, f)$) not being differentiable. The complex conjugate does not satisfy the Cauchy-Riemann equations. However, since the cost function of Eq. 8 is real, the gradient can be calculated as $$\nabla(E_{\hat{S}}) = \frac{\partial E_{\hat{S}}}{\partial \text{Re}\{H_l(f)\}} + j\frac{\partial E_{\hat{S}}}{\partial \text{Im}\{H_l(f)\}}, l = 0, 1, ..., K \quad \text{(Eq. 10)}$$

(see S. Haykin, "Adaptive Filter Theory," Prentice Hall, 2$^{nd}$ edition, 1991, which is incorporated by reference herein). Hence, the gradient will be with respect to K+1 complex taps for every frequency bin and result in a system of equations to solve for the complex AEC taps of every frequency bin. The gradient with respect to a particular complex tap, $H_k(f)$, is expanded as $$\nabla_{H_k(f)}(E_{\hat{S}}) = \frac{\partial E_{\hat{S}}}{\partial \text{Re}\{H_k(f)\}} + j\frac{\partial E_{\hat{S}}}{\partial \text{Im}\{H_k(f)\}} \quad \text{(Eq. 11)}$$
$$= \sum_m \hat{S}^*(m, f)\frac{\partial \hat{S}(m, f)}{\partial \text{Re}\{H_k(f)\}} + \hat{S}(m, f)\frac{\partial \hat{S}^*(m, f)}{\partial \text{Re}\{H_k(f)\}} +$$
$$j\sum_m \hat{S}^*(m, f)\frac{\partial \hat{S}(m, f)}{\partial \text{Im}\{H_k(f)\}} + \hat{S}(m, f)\frac{\partial \hat{S}^*(m, f)}{\partial \text{Im}\{H_k(f)\}}$$
$$= \sum_m -\hat{S}^*(m, f)X(m - k, f) - \hat{S}(m, f)X^*(m - k, f) + j\sum_m -\hat{S}^*(m, f)jX(m - k, f) + \hat{S}(m, f)jX^*(m - k, f)$$
$$= -2\sum_m \hat{S}(m, f)X_k^*(m, f)$$
$$= -2\sum_m \left(D(m, f) - \sum_{l=0}^{K} H_l(f)X(m - l, f)\right)X^*(m - k, f)$$
$$= 2\sum_{l=0}^{K} H_l(f)\left(\sum_m X(m - l, f)X^*(m - k, f)\right) - 2\left(\sum_m D(m, f)X^*(m - k, f)\right)$$
$$= 0$$

The set of K+1 equations (for k=0,1, ..., K) of Eq. 11 provides a matrix equation for every frequency bin f to solve for $H_k(f)$ k=0,1, ..., K:

$$\begin{bmatrix} \sum_m X(m, f)X^*(m, f) & \sum_m (m-1, f)X^*(m, f) & \cdots & \sum_m X(m-K, f)X^*(m, f) \\ \sum_m X(m, f)X^*(m-1, f) & \sum_m (m-1, f)X^*(m-1, f) & \cdots & \sum_m X(m-K, f)X^*(m-1, f) \\ \vdots & \vdots & \ddots & \vdots \\ \sum_m X(m, f)X^*(m-K, f) & \sum_m (m-, f)X^*(m-K, f) & \cdots & \sum_m X(m-K, f)X^*(m-K, f) \end{bmatrix} \begin{bmatrix} H_0(f) \\ H_1(f) \\ \vdots \\ H_K(f) \end{bmatrix} = \quad \text{(Eq. 12)}$$

$$\begin{bmatrix} \sum_m D(m, f)X^*(m, f) \\ \sum_m D(m, f)X^*(m-1, f) \\ \vdots \\ \sum_m D(m, f)X^*(m-K, f) \end{bmatrix}$$

This solution can be written as $$\underline{R}_X(f) \cdot H(f) = r_{D,X^*}(f) \quad \text{(Eq. 13)}$$

where $$\underline{R}_X(f) = \sum_m \underline{X}^*(m, f) \cdot \underline{X}(m, f)^T \quad \text{(Eq. 14)}$$

$$r_{D,X^*}(f) = \sum_m D(m, f) \cdot X^*(m, f) \quad \text{(Eq. 15)}$$

$$\underline{X}(m,f) = \begin{bmatrix} X(m,f) \\ X(m-1,f) \\ \vdots \\ X(m-K,f) \end{bmatrix}, \underline{H}(f) = \begin{bmatrix} H_0(f) \\ H_1(f) \\ \vdots \\ H_K(f) \end{bmatrix} \quad \text{(Eq. 16)}$$

and superscript "T" denotes non-conjugate transpose. The solution per frequency bin to the AEC taps is given by $$\underline{H}(f) = (\underline{R}_X(f))^{-1} \cdot \underline{r}_{D,X}(f) \quad \text{(Eq. 17)}$$

This appears to require a matrix inversion of order K+1. Accordingly, for a non-hybrid linear AEC it becomes a simple division consistent with Section 2.1.1. Although it requires a matrix inversion in general, in most practical applications this is not needed. Up to order 4 (hybrid order 3) direct-form solutions may be derived to solve Eq. 13. For the sake of completeness, mathematical details for deriving such solutions are provided in FIGS. 16-19. It should be noted that the correlation matrix $\underline{R}_X(f)$ is Hermitian (although not Toeplitz in general).

In one embodiment, a hybrid closed-form frequency domain solution for acoustic echo cancellation is used having a time direction filter order K=2 (i.e., 3 filter taps per frequency bin) for narrowband speech, while for wideband speech, a first order hybrid (i.e., 2 filter taps per frequency bin) is used.

2.2 Updating of Statistics

The closed-form solutions described above all require knowledge of various signal statistics: Eq. 6, 7, 14, and 15. In practice these must be estimated from the available signals/spectra, and should accommodate changes to the echo path. Changes to the echo path are a common result of a user or phone moving, or the physical environment changing. This can occur rapidly and the estimation of statistics needs to be able to properly track these changes, which are reflected in the statistics. This suggests using some sort of mean with a forgetting factor, and although many possibilities exist, a suitable approach for obtaining the estimated statistics comprises utilizing a running mean of the instantaneous statistics with a certain leakage factor (also referred to in the following as update rate). The term "instantaneous statistics" refers to individual products within the summations in Eq. 6, 7, 14 and 15.

In at least one embodiment, a rate for updating the estimated statistics necessary for implementing any of the closed-form solutions described above is controlled on a frequency bin by frequency bin basis in accordance with a measure of coherence between the frequency domain representation of the signal being sent to the speaker (e.g., X(f) as shown in FIG. 2 and elsewhere) and the frequency domain representation of the signal being received by the microphone (e.g., D(f) as shown in FIG. 2 and elsewhere) for each frequency bin. In one embodiment, the measure of coherence for each frequency bin is determined by calculating the squared magnitude of the normalized cross-spectrum between the signal being sent to the speaker and the signal being received by the microphone. However, this is only one example, and other methods for determining the measure of coherence on a frequency bin by frequency bin basis may be used.

Generally speaking, if the measure of coherence for a given frequency bin is low, then desired speech is likely being received via the microphone with little echo being present. However, if the measure of coherence is high then there is likely to be significant acoustic echo. In accordance with certain embodiments, an aggressive tracker is utilized that maps a high measure of coherence to a fast update rate for the estimated statistics and maps a low measure of coherence to a low update rate for the estimated statistics, which may include not updating at all. In an embodiment in which the statistics are estimated by calculating a running mean, the aforementioned mapping may be achieved by controlling the weight attributed to the current instantaneous statistics when calculating the mean. Thus, to achieve a slow update rate, little or no weight may be assigned to the current instantaneous statistics, but to achieve a fast update rate, more significant weight may be assigned current instantaneous statistics.

In further accordance with such an embodiment, a conservative tracker may also be used that applies a fixed update rate that is fairly slow but is constant. For each frequency bin, the result of the application of the closed-form solution of the acoustic echo canceller can be determined in accordance with the estimated statistics generated using the aggressive tracker and in accordance with the estimated statistics generated using the conservative tracker. For each frequency bin, the lower-power result may be selected as the output of the acoustic echo canceller for that frequency bin, since that result will be the one that removes the most echo. Furthermore, a "safety net" may be applied to each frequency bin such that if the selected result for that frequency bin has a power that is greater than that of the corresponding frequency bin of the microphone input signal, then the selected result may be discarded and the frequency component associated with the microphone input signal may be used instead. This can help avoid the introduction of distortion by the acoustic echo canceller and avoid divergence.

2.3 Non-Linear Acoustic Echo Cancellation

Figure 4:
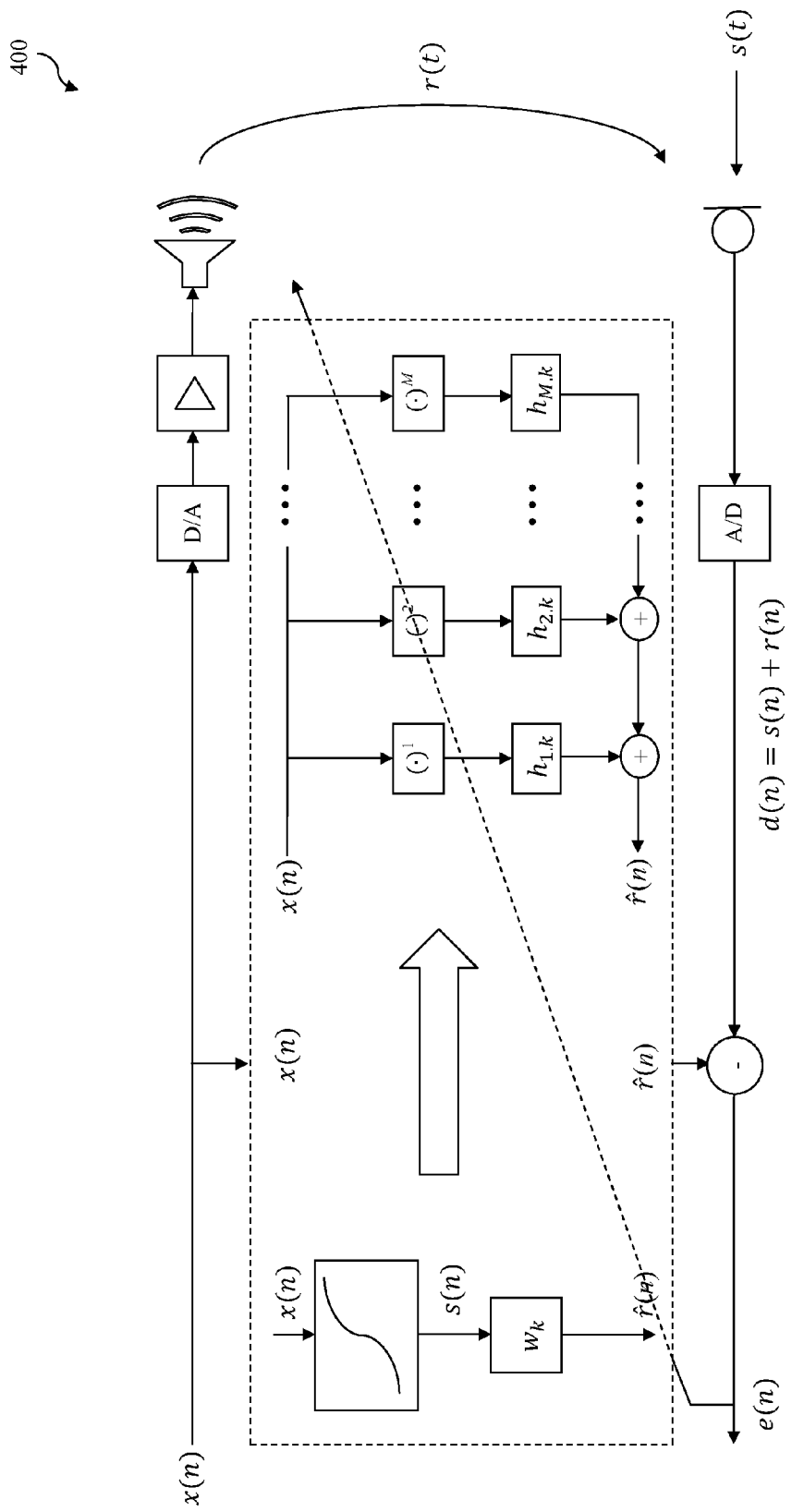
FIG. 4 is a block diagram of a system that performs acoustic echo cancellation using a non-linear acoustic echo canceller based on power filters.

The nonlinearities produced by a miniature speaker such as in a cellular handset and accompanying amplifier can be well modeled by a memoryless non-linearity. (See F. Kuech, A. Mitnacht, W. Kellermann, "Nonlinear Acoustic Echo Cancellation Using Adaptive Orthogonalized Power Filters," Proc. IEEE ICASSP, 2005, pp. 111-105-111-108, the entirety of which is incorporated by reference). By approximating such a non-linearity by a Taylor expansion, a non-linear acoustic echo canceller based on power filters can be deduced. This is generally represented by system 400 of FIG. 4.

Figure 5:
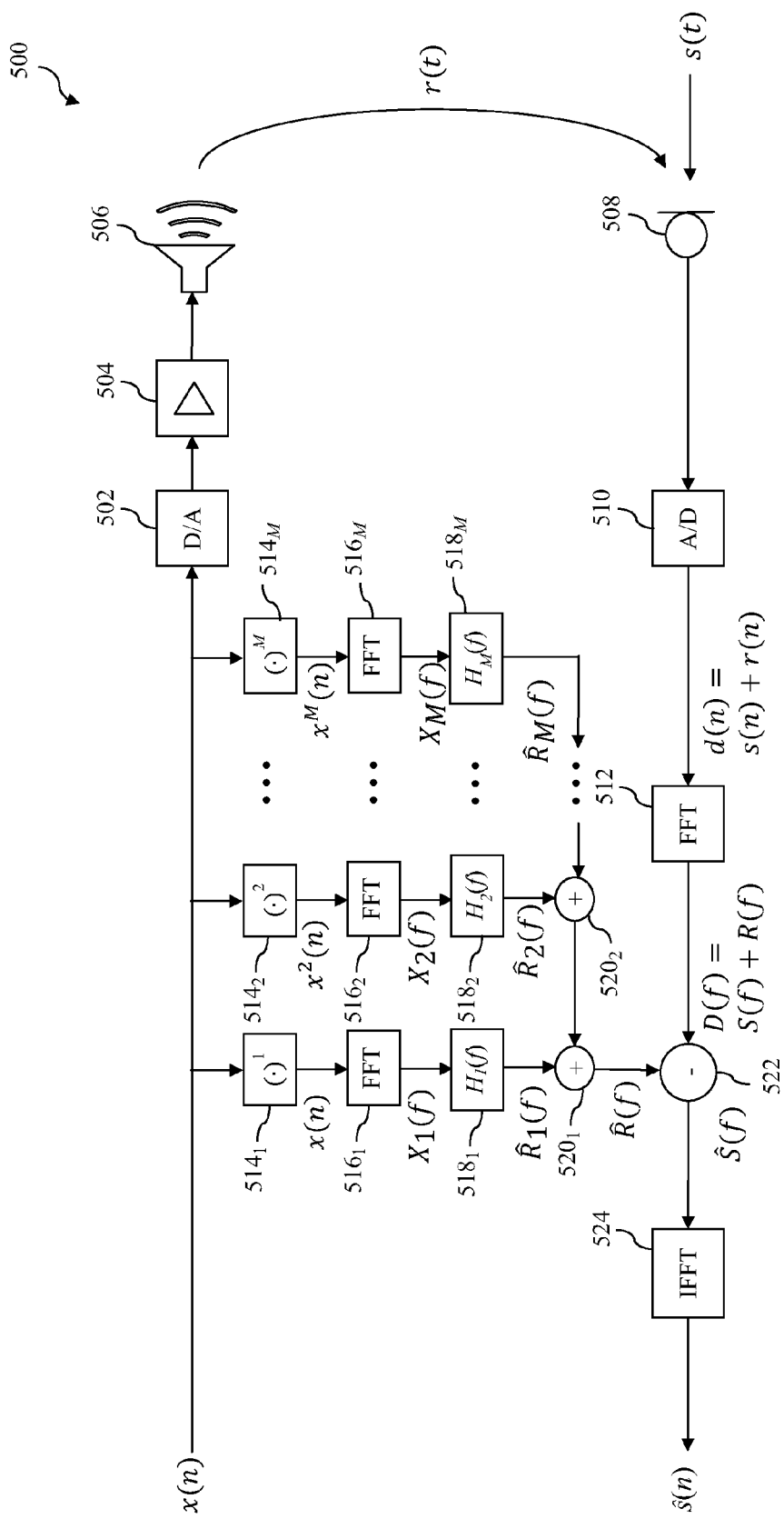
FIG. 5 is a block diagram of a system that includes a non-linear acoustic echo canceller similar to that shown in FIG. 4 but transformed to the frequency domain.

This structure is linear in the filters $h_1(k), h_2(k), \ldots, h_M(k)$ and by transforming the linear part of the structure to the frequency domain, system 500 shown in FIG. 5 is obtained. System 500 may be implemented, for example, in an audio communication system or device.

As shown in FIG. 5, system 500 is operable to receive a far-end speech signal x(n). Far-end speech signal x(n) is converted from digital to analog form by a D/A converter 502, amplified by an amplifier 504, and played back by a loudspeaker 506. As further shown in FIG. 5, a microphone 508 is operable to pick up the speech of a near-end speaker, represented as s(t), as well as an echo of the far-end speech being played back by loudspeaker 506, shown as r(t). The acoustic echo signal is subject to the acoustic environment and, as an example, is affected by the room impulse response. The signal captured by microphone 508 is passed to an A/D converter 510, which converts it from analog to digital form. The output of A/D converter 510 is a microphone signal d(n), which is the sum of a near-end speech signal s(n) plus an acoustic echo signal r(n). Microphone signal d(n) is passed to an FFT component 512 that operates to produce a frequency domain representation of microphone signal d(n), which is shown as D(f). D(f) is the sum of a frequency domain representation of near-end speech signal s(n), which is shown as S(f), and a frequency domain representation of acoustic echo signal r(n), which is shown as R(f).

As also shown in FIG. 5, far-end speech signal x(n) is also passed to a series of preprocessors $514_1$-$514_M$, each of which raises the samples of x(n) to a particular power (e.g., preprocessor $514_1$ raises the samples of x(n) to the power of 1, preprocessor $514_2$ raises the samples of x(n) to the power of 2, and preprocessor $514_M$ raises the samples of x(n) to the power of M), thereby generating a corresponding series of time domain signals x(n)-$x^M$(n). Each of these signals is passed to a corresponding one of FFT component $516_1$-$516_M$, which operates to generate a frequency domain representation thereof. The frequency domain signals output by FFT components $516_1$-$516_M$ are denoted $X_1$(f)-$X_M$(f). Each of these frequency domain signals is passed to a corresponding one of filters $518_1$-$518_M$, which operates to filter the signal in the frequency domain in accordance with a corresponding one of acoustic echo cancellation power filters $H_1$(f) through $H_M$(f). The outputs of filters $518_1$ through $518_M$ are summed by combiners $520_1$ through $520_{M-1}$, thereby producing an estimated acoustic echo signal in the frequency domain, $\hat{R}$(f). A combiner 522 subtracts $\hat{R}$(f) from D(f), thereby producing an estimated near-end speech signal in the frequency domain, $\hat{S}$(f). $\hat{S}$(f) is then passed to an IFFT component 524 that operates to produce a time domain representation of $\hat{S}$(f), which is shown as $\hat{s}$(n). Estimated near-end speech signal $\hat{s}$(n) may then be transmitted to another node in an audio communication system, such as a far-end audio communication system or device.

The objective of suppressing R(f) in D(f) based on $X_1$(f), $X_2$(f), ..., $X_M$(f) can be achieved by minimizing the output power of the acoustic echo canceller:

$$E_{\hat{S}} = E\{\hat{s}^2(n)\} \quad \text{(Eq. 18)}$$
$$\approx \sum_n \hat{s}^2(n)$$
$$= \sum_m \sum_f \hat{S}(m, f) \cdot \hat{S}^*(m, f)$$

where n is the discrete time index, m is the frame index for the DFTs, and f is the frequency index. The output is expanded as $$\hat{S}(m, f) = D(m, f) - \hat{R}(m, f) \quad \text{(Eq. 19)}$$
$$= D(m, f) - \sum_{l=1}^{M} H_l(f) \cdot X_l(m, f)$$

Allowing the AEC taps, $H_1$(f), to be complex prevents taking the derivative with respect to the coefficients due to the complex conjugate (of $\hat{S}$(m, f)) not being differentiable. The complex conjugate does not satisfy the Cauchy-Riemann equations. However, since the cost function of Eq. 18 is real, the gradient can be calculated as $$\nabla(E_{\hat{S}}) = \frac{\partial E_{\hat{S}}}{\partial \text{Re}\{H_l(f)\}} + j\frac{\partial E_{\hat{S}}}{\partial \text{Im}\{H_l(f)\}}, l = 1, 2, \ldots M \quad \text{(Eq. 20)}$$

(see S. Haykin, "Adaptive Filter Theory," Prentice Hall, $2^{nd}$ edition, 1991, which is incorporated by reference herein). Hence, the gradient will be with respect to M complex taps for every frequency bin and result in a system of equations to solve for the complex AEC taps of every frequency bin. The gradient with respect to a particular complex tap, $H_k$(f), is expanded as $$\nabla_{H_k(f)}(E_{\hat{S}}) = \frac{\partial E_{\hat{S}}}{\partial \text{Re}\{H_k(f)\}} + j\frac{\partial E_{\hat{S}}}{\partial \text{Im}\{H_k(f)\}} \quad \text{(Eq. 21)}$$
$$= \sum_m \hat{S}^*(m, f)\frac{\partial \hat{S}(m, f)}{\partial \text{Re}\{H_k(f)\}} + \hat{S}(m, f)\frac{\partial \hat{S}^*(m, f)}{\partial \text{Re}\{H_k(f)\}} +$$
$$j\sum_m \hat{S}^*(m, f)\frac{\partial \hat{S}(m, f)}{\partial \text{Im}\{H_k(f)\}} + \hat{S}(m, f)\frac{\partial \hat{S}^*(m, f)}{\partial \text{Im}\{H_k(f)\}}$$
$$= \sum_m -\hat{S}^*(m, f)X_k(m, f) - \hat{S}(m, f)X_k^*(m, f) +$$
$$j\sum_m -\hat{S}^*(m, f)jX_k(m, f) + \hat{S}(m, f)jX_k^*(m, f)$$
$$= -2\sum_m \hat{S}(m, f)X_k^*(m, f)$$
$$= -2\sum_m \left(D(m, f) - \sum_{l=1}^{M} H_l(f)X_l(m, f)\right)X_k^*(m, f)$$
$$= 2\sum_{l=1}^{M} H_l(f)\left(\sum_m X_l(m, f)X_k^*(m, f)\right) - 2\left(\sum_m D(m, f)X_k^*(m, f)\right)$$
$$= 0$$

The set of M equations (for k=1,2, ... M) of Eq. 21 provides a matrix equation for every frequency bin f to solve for $H_k$(f) k=1,2, ..., M:

$$\begin{bmatrix} \sum_m X_1(m, f)X_1^*(m, f) & \sum_m X_2(m, f)X_1^*(m, f) & \cdots & \sum_m X_M(m, f)X_1^*(m, f) \\ \sum_m X_1(m, f)X_2^*(m, f) & \sum_m X_2(m, f)X_2^*(m, f) & \cdots & \sum_m X_M(m, f)X_2^*(m, f) \\ \vdots & \vdots & \ddots & \vdots \\ \sum_m X_1(m, f)X_M^*(m, f) & \sum_m X_2(m, f)X_M^*(m, f) & \cdots & \sum_m X_M(m, f)X_M^*(m, f) \end{bmatrix} \begin{bmatrix} H_1(f) \\ H_2(f) \\ \vdots \\ H_M(f) \end{bmatrix} = \begin{bmatrix} \sum_m D(m, f)X_1^*(m, f) \\ \sum_m D(m, f)X_2^*(m, f) \\ \vdots \\ \sum_m D(m, f)X_M^*(m, f) \end{bmatrix} \quad \text{(Eq. 22)}$$

This solution can be written as $$\underline{R}_X(f) \cdot \underline{H}(f) = \underline{r}_{D,X^*}(f) \quad \text{(Eq. 23)}$$

where $$\underline{R}_X(f) = \sum_m \underline{X}^*(m, f) \cdot \underline{X}(m, f)^T \quad \text{(Eq. 24)}$$

$$\underline{r}_{D,X^*}(f) = \sum_m D(m, f) \cdot \underline{X}^*(m, f) \quad \text{(Eq. 25)}$$

$$\underline{X}(m, f) = \begin{bmatrix} X_1(m, f) \\ X_2(m, f) \\ \vdots \\ X_M(m, f) \end{bmatrix}, \underline{H}(f) = \begin{bmatrix} H_1(f) \\ H_2(f) \\ \vdots \\ H_M(f) \end{bmatrix} \quad \text{(Eq. 26)}$$

and superscript "T" denotes non-conjugate transpose. The solution per frequency bin to the AEC taps on the outputs from the blocking matrices is given by $$\underline{H}(f) = (\underline{R}_X(f))^{-1} \underline{r}_{D,X^*}(f) \quad \text{(Eq. 27)}$$

This appears to require a matrix inversion of an order equivalent to the number of power filters. Accordingly, for a linear AEC it becomes a simple division. Although it requires a matrix inversion in general, in most practical applications this is not needed. Up to order 4 (power 4) closed-form solutions can be derived to solve Eq. 23. For the sake of completeness, mathematical details for deriving such solutions are provided in FIGS. 16-19. It should be noted that the correlation matrix $\underline{R}_X(f)$ is Hermitian (although not Toeplitz in general).

2.4 Practical Non-Linear Acoustic Echo Cancellation

The systems for performing non-linear acoustic echo cancellation described above in Section 2.3 quickly become impractical as the number of powers increases. Experiments showed a notable increase in Echo Return Loss Enhancement (ERLE) with the joint set of powers from 2 through 12. This is, however, impractical to implement. This section focuses on a practical alternative for performing non-linear acoustic echo cancellation. The fundamental structure is represented by system 600 of FIG. 6. As will be discussed below, system 600 utilizes a non-linear preprocessing function to generate an echo reference signal containing non-linear products for a second-stage AEC that operates on the output of a linear AEC. System 600 may be implemented, for example, in an audio communication system or device.

Although in the following the linear AEC and the second-stage AEC are implemented using closed form solutions, it is noted that each of these components may also be implemented using traditional adaptive solutions as well. Furthermore, although in the following the linear AEC and the second-stage AEC are described as being frequency domain acoustic echo cancellers, it is noted that the linear AEC and/or the second-stage AEC may be implemented as acoustic echo cancellers that operate in the time domain as well.

Figure 6:
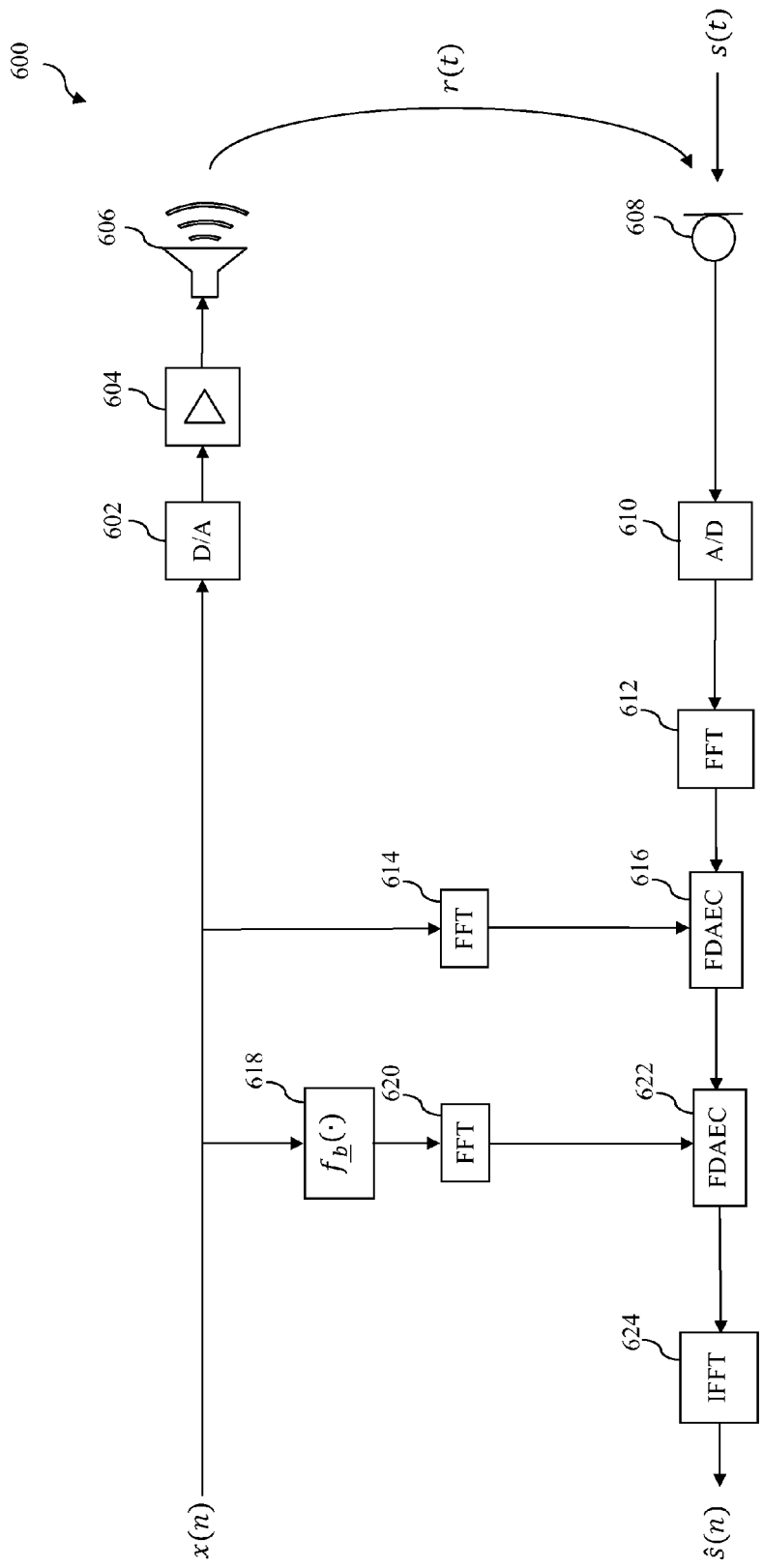
FIG. 6 is a block diagram of a system that includes a practical non-linear acoustic echo cancellation structure.

As shown in FIG. 6, system 600 is operable to receive a far-end speech signal x(n). Far-end speech signal x(n) is converted from digital to analog form by a D/A converter 602, amplified by an amplifier 604, and played back by a loudspeaker 606. As further shown in FIG. 6, a microphone 608 is operable to pick up the speech of a near-end speaker, represented as s(t), as well as an echo of the far-end speech being played back by loudspeaker 606, shown as r(t). The acoustic echo signal is subject to the acoustic environment and, as an example, is affected by the room impulse response. The signal captured by microphone 608 is passed to an A/D converter 610, which converts it from analog to digital form. The output of A/D converter 610 is a microphone signal that is passed to an FFT component 612. FFT component 612 operates to generate a frequency domain representation of the microphone signal. The frequency domain representation of the microphone signal is provided as an input to a first frequency domain acoustic echo canceller (FDAEC) 616.

As also shown in FIG. 6, far-end speech signal x(n) is also passed to an FFT component 614 that operates to produce a frequency domain representation thereof. This signal is provided as a further input to first FDAEC 616. First FDAEC 616 utilizes the frequency domain representation of x(n) as a reference signal for obtaining an estimated linear acoustic echo signal. First FDAEC 616 subtracts the estimated linear acoustic echo signal from the microphone signal in the frequency domain, thereby generating a first estimated near-end speech signal. First FDAEC 616 then outputs the first estimated near-end speech signal, which is received as an input by a second FDAEC 622.

First FDAEC 616 may comprise, for example, an AEC that implements a closed-form single-tap frequency domain solution such as that described above in Section 2.1.1 or an AEC that implements a hybrid closed-form frequency domain solution such as that described above in Section 2.1.2. However, these are examples only are not intended to be limiting.

As further shown in FIG. 6, far-end speech signal x(n) is also passed to a preprocessor 618 that applies a preprocessing function $f_b(\cdot)$ thereto, thereby producing a non-linear acoustic echo reference signal. Preprocessing function $f_b(\cdot)$ is responsible for modeling the non-linear couplings present in the echo path such that the non-linear acoustic echo reference signal contains similar non-linearities to those present in the output signal produced by first FDAEC 616. The non-linear acoustic echo reference signal output by preprocessor 618 is passed to an FFT component 620, which converts that signal from the time domain to the frequency domain. The frequency domain representation of the non-linear acoustic echo reference signal is passed to second FDAEC 622.

Second FDAEC 622 utilizes the frequency domain representation of the non-linear acoustic echo reference signal to obtain an estimated non-linear acoustic echo signal. Second FDAEC 622 subtracts the estimated non-linear acoustic echo signal from the first estimated near-end speech signal output by first FDAEC 616 in the frequency domain, thereby generating a second estimated near-end speech signal. Second FDAEC 622 then outputs the second estimated near-end speech signal, which is passed to an IFFT component 624. IFFT component 624 converts the second estimated near-end speech signal from the frequency domain to the time domain. The time domain version of this signal, shown as ŝ(n), may then be transmitted to another node in an audio communication system, such as a far-end audio communication system or device.

Figure 7:
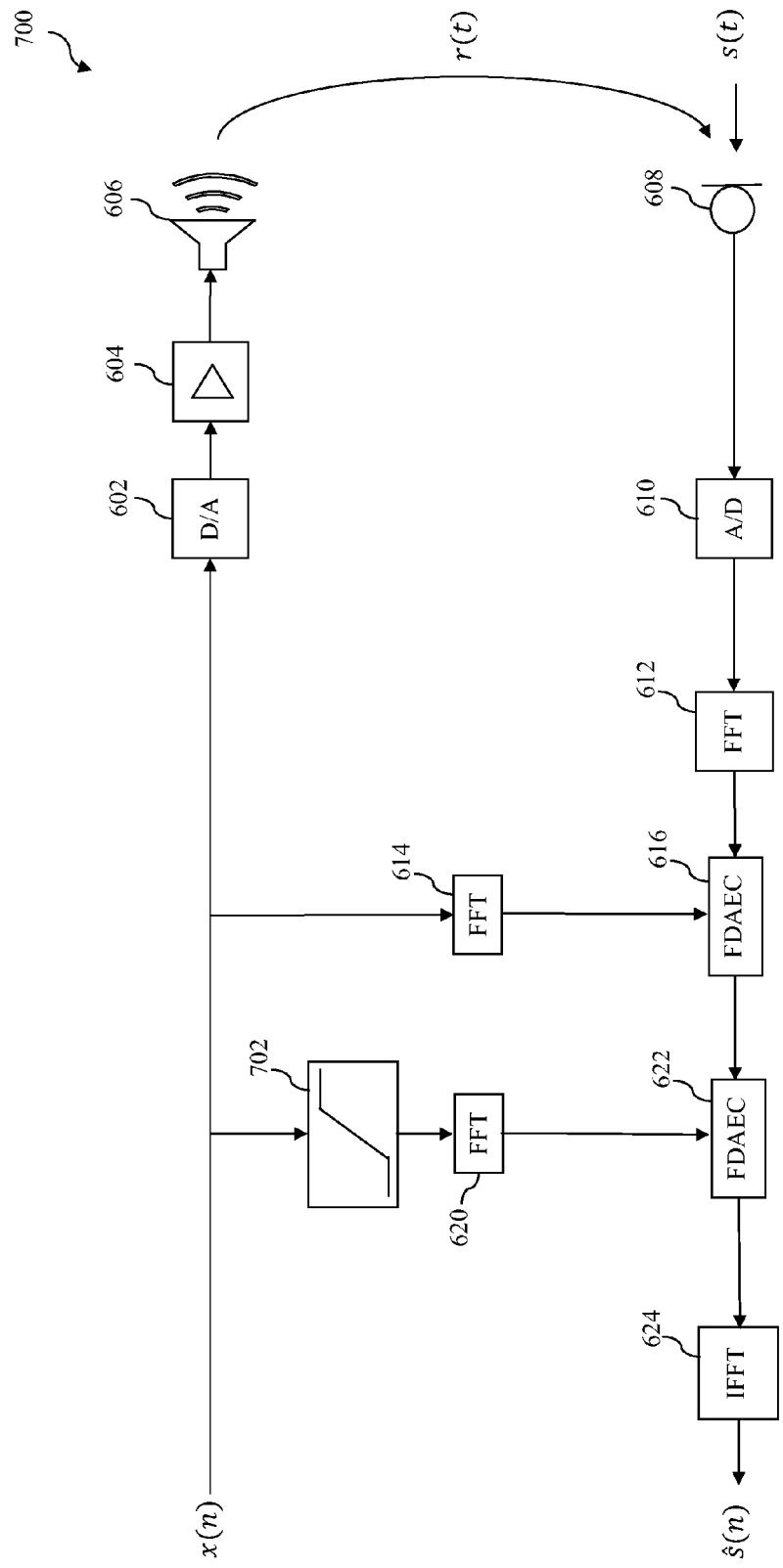
FIG. 7 is a block diagram of a system that includes a practical non-linear acoustic echo cancellation structure with a memoryless limiter.

The non-linear couplings present in the echo path may be due to amplifier 604 and loudspeaker 606. In certain implementations, such non-linearities may be approximated by a memoryless limiter. FIG. 7 is a block diagram of a system 700 in which the preprocessor 618 of system 600 has been replaced by a memoryless limiter 702.

Like first FDAEC 616, second FDAEC 622 may comprise an AEC that implements a closed-form single-tap frequency domain solution such as that described above in Section 2.1.1 or an AEC that implements a hybrid closed-form frequency domain solution such as that described above in Section 2.1.2. However, these are examples only are not intended to be limiting.

Figure 8:
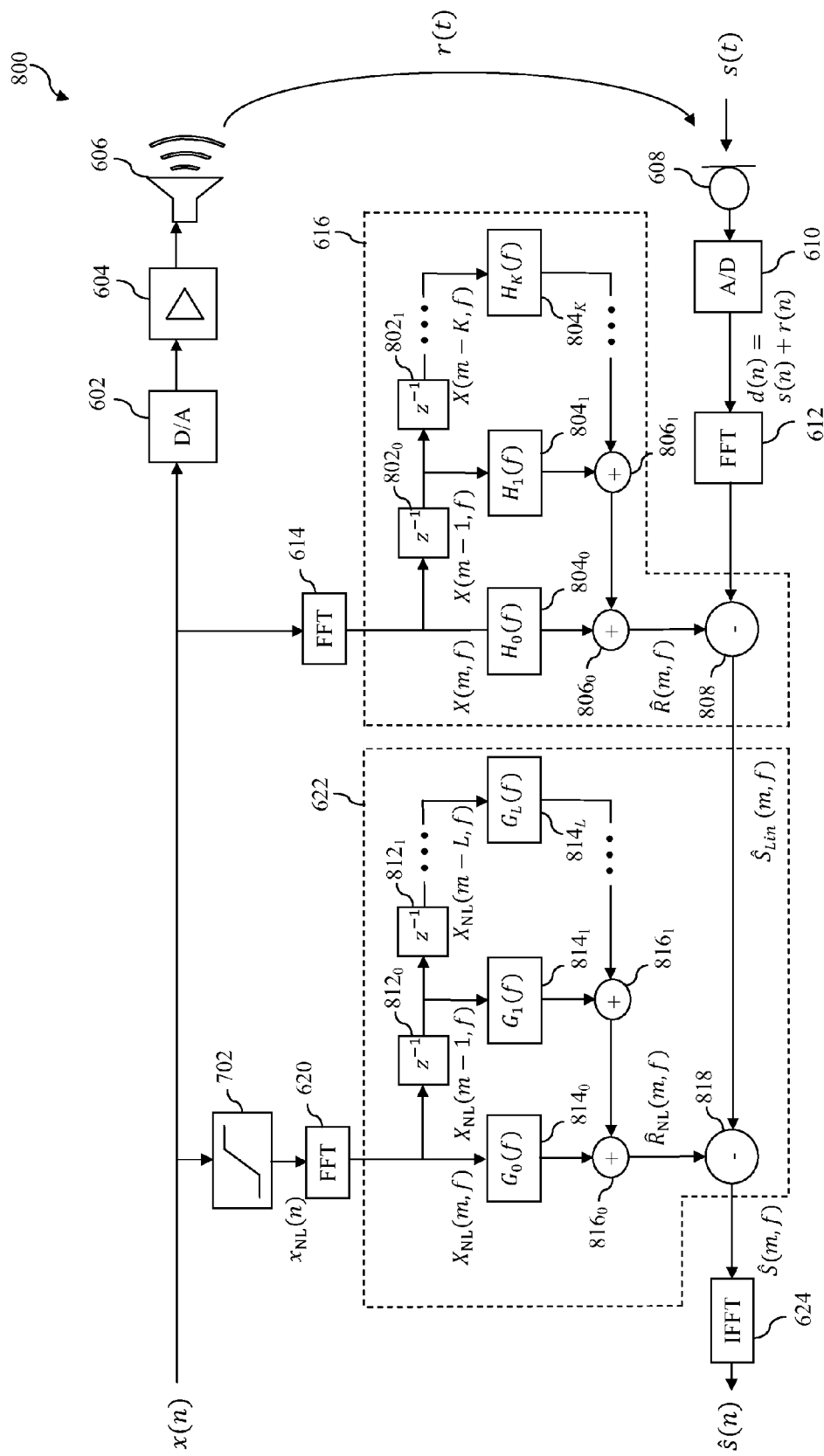
FIG. 8 is a block diagram of a system that includes a practical non-linear acoustic echo cancellation structure comprising two hybrid frequency domain acoustic echo cancellers (FDAECs) and a memoryless limiter.

FIG. 8 is a block diagram of an example system 800 in which first FDAEC 616 and second FDAEC 622 are each implemented using a hybrid closed-form frequency domain solution such as that described above in Section 2.1.2. As was the case for system 300 of FIG. 3, the notion of time has been introduced to all the spectra shown in FIG. 8 by the variable m which is the FFT frame index. As was also the case for system 300 of FIG. 3, the unit of the delay lines shown in system 800 is one frame—in other words, $z^{-1}$ means one frame or FFT sample delay.

In accordance with system 800 of FIG. 8, first FDAEC 616 receives a frequency domain representation of far-end speech signal x(n) for FFT frame m, denoted X(m, f), from FFT component 614. Each frequency sub-band or component of X(m, f) is passed through a corresponding time direction filter having a set of acoustic echo cancellation taps $H_0(f)$ through $H_K(f)$ (collectively denoted taps $804_0$ through $804_K$ in FIG. 8). A delay line comprising a plurality of delay elements $802_0$ through $802_{K-1}$ operates to produce the necessary time-delayed frequency components for each time direction filter. The outputs of taps $804_0$ through $804_K$ are summed by combiners $806_0$ through $806_{K-1}$ for each time direction filter, thereby producing an estimated linear acoustic echo signal in the frequency domain for FFT frame m, $\hat{R}(m, f)$. A combiner 808 subtracts $\hat{R}(m, f)$ from the frequency domain representation of the microphone signal output by FFT component 612, thereby producing a first estimated near-end speech signal in the frequency domain for FFT frame m, denoted $\hat{S}_{Lin}(m, f)$. $\hat{S}_{Lin}(m, f)$ is then passed as an input to second FDAEC 622.

As further shown in FIG. 8, second FDAEC 622 receives a frequency domain representation of a non-linear acoustic echo reference signal for FFT frame m, denoted $X_{NL}(m, f)$, from FFT component 620. Each frequency sub-band component of $X_{NL}(m, f)$ is passed through a corresponding time direction filter having a set of acoustic echo cancellation taps $G_0(f)$ through $G_L(f)$ (collectively denoted taps $814_0$ through $814_L$ in FIG. 8). A delay line comprising a plurality of delay elements $812_0$ through $812_{L-1}$ operates to produce the necessary time-delayed frequency components for each time direction filter. The outputs of taps $814_0$ through $814_L$ are summed by combiners $816_0$ through $816_{L-1}$ for each time direction filter, thereby producing an estimated non-linear acoustic echo signal in the frequency domain for FFT frame m, $\hat{R}_{NL}(m, f)$. A combiner 818 subtracts $\hat{R}_{NL}(m, f)$ from $\hat{S}_{Lin}(m, f)$, thereby producing a second estimated near-end speech signal in the frequency domain for FFT frame m, $\hat{S}(m, f)$. $\hat{S}(m, f)$ is then passed to IFFT component 624 that operates to produce a time domain representation of $\hat{S}(m, f)$, which is $\hat{s}(n)$.

The time direction filter order K for first FDAEC 616 and/or the time direction filter order L for second FDAEC 622 can be frequency dependent so that the frequency resolution is not increased to the same extent in all frequency ranges.

The solution for the taps for $G_0(f)$ through $G_L(f)$ can be easily written from Section 2.1.2 as $$\underline{G}(f) = \left(\underline{R}_{X_{NL}}(f)\right)^{-1} \cdot \underline{r}_{S_{Lin}, X_{NL}}(f),$$

where $$\underline{R}_{X_{NL}}(f) = \sum_m \underline{X}^*_{NL}(m, f) \cdot \underline{X}_{NL}(m, f)^T, \quad \text{(Eq. 28)}$$

$$\underline{r}_{S_{Lin}, X^*_{NL}}(f) = \sum_m \hat{S}_{Lin}(m, f) \cdot \underline{X}^*_{NL}(m, f) \quad \text{(Eq. 29)}$$

and $$\underline{X}_{NL}(m, f) = \begin{bmatrix} X_{NL}(m, f) \\ X_{NL}(m-1, f) \\ \vdots \\ X_{NL}(m-L, f) \end{bmatrix}, \underline{G}(f) = \begin{bmatrix} G_0(f) \\ G_1(f) \\ \vdots \\ G_L(f) \end{bmatrix}. \quad \text{(Eq. 30)}$$

It is also straightforward to write the solution for joint optimization of $\underline{H}(f)$ and $\underline{G}(f)$, but it will come at increased complexity compared to a sequential approach. Additionally, in practice it was found that using the coherence between $\hat{S}_{Lin}(m, f)$ and $X_{NL}(m, f)$ to control adaptive estimation of $\underline{R}_{X_{NL}}(f)$ and $\underline{r}_{Lin, x_{NL}}(f)$ works well. This further motivates a sequential approach.

Figure 9:
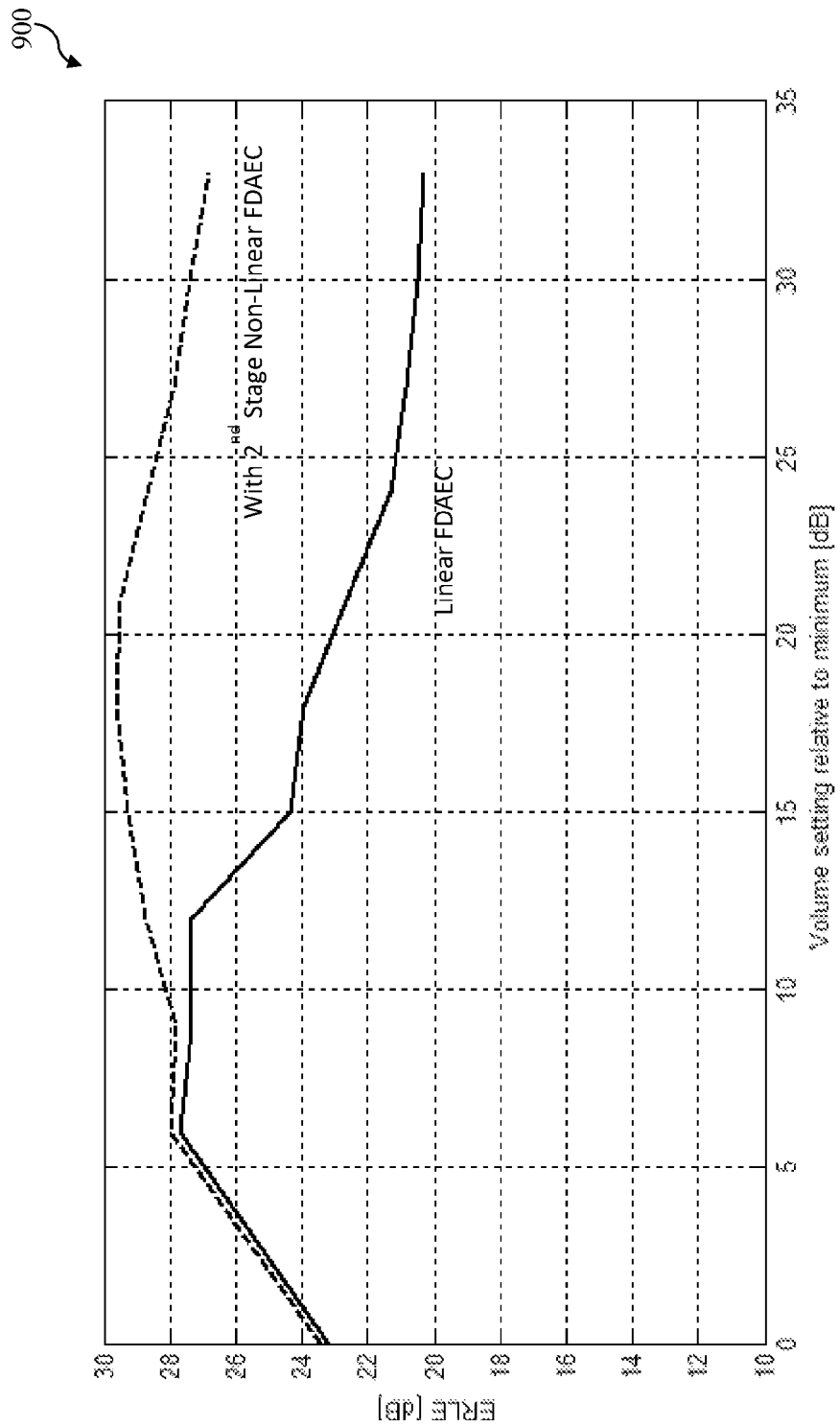
FIG. 9 depicts a graph showing the performance of two different acoustic echo cancellation structures in accordance with two different embodiments.

FIG. 9 depicts a graph 900 that represents performance evaluations for a cellular handset operating in speakerphone mode. The graph illustrates that a system utilizing a $2^{nd}$ order second-stage non-linear FDAEC provides an improvement in ERLE by 6 decibels (dB) to 7 dB as compared to a system that utilizes only a single linear FDAEC. The simulations performed to generate this data used a fixed saturation at 18 dB below maximum amplitude.

2.4.1 Adaptive Non-Linear Preprocessing Function

The simulation results shown in FIG. 9 are based on a fixed non-linear preprocessing function in the form of a limiter with fixed saturation threshold. In practice, it is likely advantageous to make parameters of the preprocessing function adaptive. This section derives a method to adaptively update the parameters b of the preprocessing function $f_{\underline{b}}(\cdot)$. For the simple memoryless limiter this would be the saturation threshold.

Figure 10:
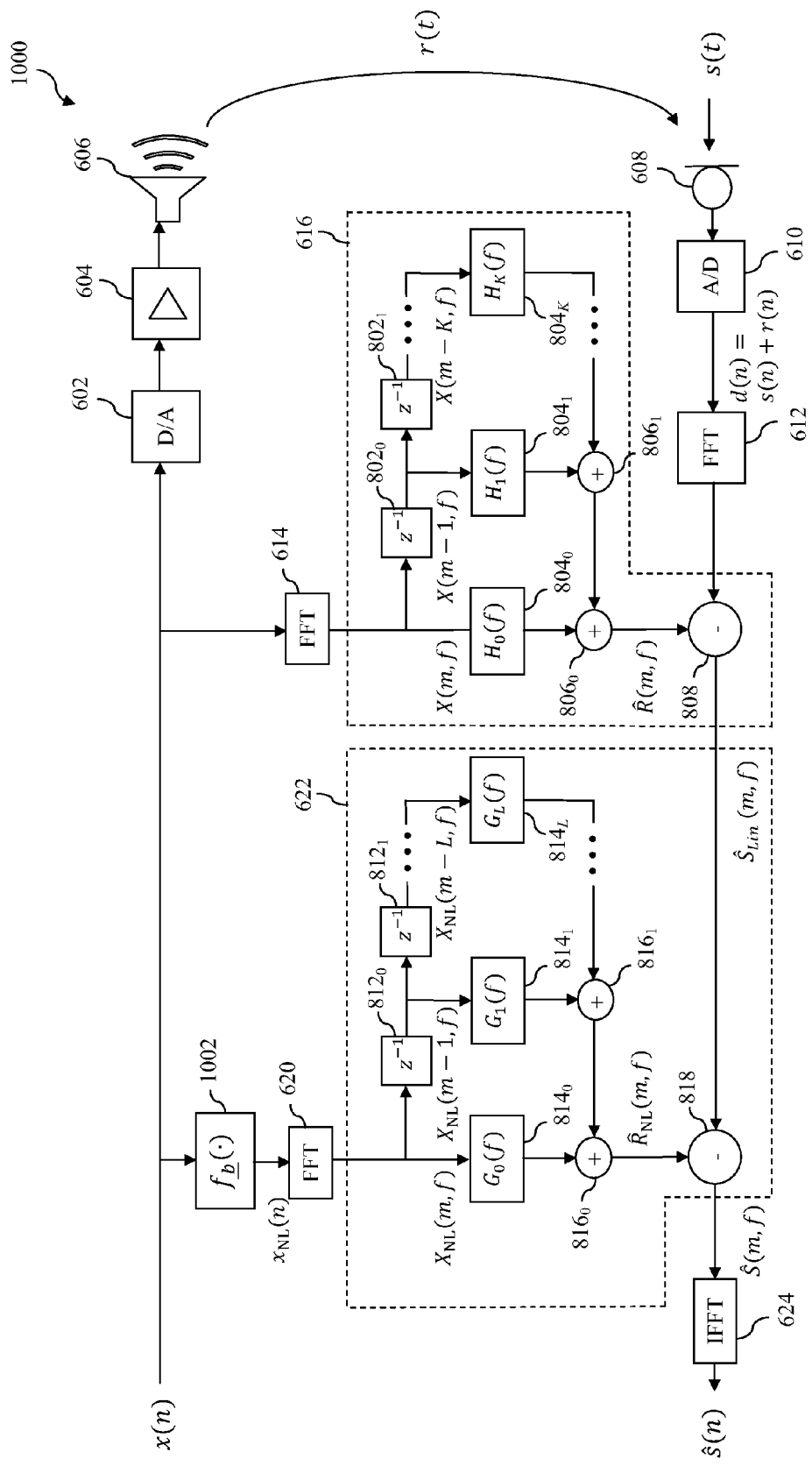
FIG. 10 is a block diagram of a system that includes a practical non-linear acoustic echo cancellation structure comprising two hybrid FDAECs and a preprocessor that performs a generic preprocessing function.

FIG. 10 is a block diagram of a system 1000 that is similar to system 800 of FIG. 8, except that memoryless limiter 702 has been replaced by a preprocessor 1002 that applies the more generic preprocessing function $f_{\underline{b}}(\cdot)$.

From system 1000 of FIG. 10, it is evident that the parameters of the preprocessing function (in the time domain) affect all frequency bins, and hence minimization of a cost function with respect to the parameters will not be independent for each frequency bin as seen earlier when deriving solutions for the taps $\underline{G}(f)$. Consequently, it would become overly complicated to derive a solution jointly optimizing the taps $\underline{G}(f)$ and the parameters $\underline{b}$. Instead an adaptive algorithm can be derived for estimating the parameters $\underline{b}$. For that purpose the gradient of the cost function with respect to the parameters is derived.

2.4.1.1 Gradient with Respect to Preprocessing Function for Non-Hybrid Non-Linear FDAEC Initially, for simplicity the gradient with respect to the parameters of the preprocessing function is carried out assuming a non-hybrid non-linear FDAEC. Similar to previous sections the objective is to minimize the output power of the acoustic echo canceller:

$$E_{\hat{S}} = E\{\hat{s}^2(n)\} \quad \text{(Eq. 31)}$$

$$\approx \sum_n \hat{s}^2(n)$$

$$= \sum_m \sum_f \hat{S}(m, f) \cdot \hat{S}^*(m, f),$$

where n is the discrete time index, m is the frame index for the DFTs, and f is the frequency index. The output is expanded as $$\hat{S}(m, f) = \hat{S}_{Lin}(m, f) - \hat{R}_{NL}(m, f) \quad \text{(Eq. 32)}$$

$$= \hat{S}_{Lin}(m, f) - G_0(f) \cdot X_{NL}(m, f)$$

$$= \hat{S}_{Lin}(m, f) - G_0(f) \cdot \sum_{n=0}^{N-1} w(n) \cdot f_{\underline{b}}(x(m, n)) \cdot e^{-j2\pi fn/N},$$

where $x(m, n)$, $n=0, N-1$ is the current frame of the input signal, weighted by the analysis window, $w(n), n=0, \ldots, N-1$.

The gradient can be calculated as $$\nabla_{\underline{b}}(E_{\hat{S}}) = \frac{\partial E_{\hat{S}}}{\partial \underline{b}} \quad \text{(Eq. 33)}$$

$$= \sum_{m} \sum_{f} \hat{S}^*(m, f) \frac{\partial \hat{S}(m, f)}{\partial \underline{b}} + \hat{S}(m, f) \frac{\partial \hat{S}^*(m, f)}{\partial \underline{b}}$$

$$= -\sum_{m} \sum_{f} \left( \hat{S}_{Lin}^*(m, f) - G_0^*(f) \cdot \sum_{n=0}^{N-1} w(n) \cdot f_{\underline{b}}(x(m, n)) \cdot \right.$$

$$\left. e^{j2\pi fn/N} \right) G_0(f) \cdot \sum_{n=0}^{N-1} w(n) \cdot \frac{\partial f_{\underline{b}}(x(m,n))}{\partial \underline{b}} \cdot e^{-j2\pi fn/N}$$

$$- \sum_{m} \sum_{f} \left( \hat{S}_{Lin}(m, f) - G_0(f) \cdot \sum_{n=0}^{N-1} w(n) \cdot f_{\underline{b}}(x(m, n)) \cdot \right.$$

$$\left. e^{-j2\pi fn/N} \right) G_0^*(f) \cdot \sum_{n=0}^{N-1} w(n) \cdot \frac{\partial f_{\underline{b}}(x(m, n))}{\partial \underline{b}} \cdot e^{j2\pi fn/N},$$

With a non-linear preprocessing function it will be difficult to derive a closed form solution for $\underline{b}$ by setting the gradient to zero. However, the numerical value of the gradient can be calculated and used in a steepest gradient descent type algorithm. The numerical value of the gradient at frame m is reduced to $$\nabla_{\underline{b}}(E_{\hat{S}}(m)) = -\sum_{f} \hat{S}^*(m, f) G_0(f) \cdot \sum_{n=0}^{N-1} w(n) \cdot \frac{\partial f_{\underline{b}}(x(m, n))}{\partial \underline{b}} \cdot \quad \text{(Eq. 34)}$$

$$e^{-j2\pi fn/N} + \left( \hat{S}^*(m, f) G_0(f) \cdot \sum_{n=0}^{N-1} w(n) \cdot \right.$$

$$\left. \frac{\partial f_{\underline{b}}(x(m, n))}{\partial \underline{b}} \cdot e^{-j2\pi fn/N} \right)^*$$

$$= -\sum_{f} \hat{S}^*(m, f) G_0(f) \cdot DFT\left\{ \frac{\partial f_{\underline{b}}(x(m, n))}{\partial \underline{b}}, f \right\} +$$

$$\left( \hat{S}^*(m, f) G_0(f) \cdot DFT\left\{ \frac{\partial f_{\underline{b}}(x(m, n))}{\partial \underline{b}}, f \right\} \right)^*$$

$$= -2 \sum_{f} \text{Re}\left\{ \hat{S}^*(m, f) G_0(f) \cdot DFT\left\{ \frac{\partial f_{\underline{b}}(x(m, n))}{\partial \underline{b}}, f \right\} \right\}$$

It requires the calculation of the DFT of the derivatives of the preprocessing function with respect to $\underline{b}$ at the input samples of the current frame m. The parameters of the preprocessing function can be adaptively tracked/estimated by a steepest descent algorithm $$\underline{b}(m+1) = \underline{b}(m) - \frac{1}{2}\mu \cdot \nabla_{\underline{b}}(E_{\hat{S}}(m)) \quad \text{(Eq. 35)}$$

(See S. Haykin, "Adaptive Filter Theory," Prentice Hall, $2^{nd}$ edition, 1991, which is incorporated by reference herein).

2.4.1.2 Gradient with Respect to Preprocessing Function for Hybrid Non-Linear FDAEC With a hybrid non-linear FDAEC the output becomes $$\hat{S}(m, f) = \hat{S}_{Lin}(m, f) - \hat{R}_{NL}(m, f) \quad \text{(Eq. 36)}$$

$$= \hat{S}_{Lin}(m, f) - G_0(f) \cdot X_{NL}(m, f)$$

$$= \hat{S}_{Lin}(m, f) - \sum_{l=0}^{L} G_l(f) \cdot \sum_{n=0}^{N-1} w(n) \cdot f_{\underline{b}}(x(m - l, n)) \cdot e^{-j2\pi fn/N},$$

where L is the hybrid order. The numerical value of the gradient at frame m is $$\nabla_{\underline{b}}(E_{\hat{S}}(m)) = -\sum_{f} \hat{S}^*(m, f) \sum_{l=0}^{L} G_l(f) \cdot \sum_{n=0}^{N-1} w(n) \cdot \quad \text{(Eq. 37)}$$

$$\frac{\partial f_{\underline{b}}(x(m-l, n))}{\partial \underline{b}} \cdot e^{-j2\pi fn/N} + \left( \hat{S}^*(m, \right.$$

$$\left. f) \sum_{l=0}^{L} G_l(f) \cdot \sum_{n=0}^{N-1} w(n) \cdot \frac{\partial f_{\underline{b}}(x(m-l, n))}{\partial \underline{b}} \cdot \right.$$

$$\left. e^{-j2\pi fn/N} \right)^*$$

$$= -\sum_{f} \hat{S}^*(m, f) \sum_{l=0}^{L} G_l(f) \cdot DFT\left\{ \frac{\partial f_{\underline{b}}(x(m-l, n))}{\partial \underline{b}}, \right.$$

$$\left. f \right\} + \left( \hat{S}^*(m, f) \sum_{l=0}^{L} G_l(f) \cdot DFT\left\{ \frac{\partial f_{\underline{b}}(x(m-l, n))}{\partial \underline{b}}, \right. \right.$$

$$\left. \left. f \right\} \right)^*$$

$$= -2 \sum_{f} \text{Re}\left\{ \hat{S}^*(m, f) \sum_{l=0}^{L} G_l(f) \cdot \right.$$

$$\left. DFT\left\{ \frac{\partial f_{\underline{b}}(x(m-l, n))}{\partial \underline{b}}, f \right\} \right\}$$

Hence, to accommodate the hybrid feature the DFT of the derivative of the preprocessing function needs to be buffered.

2.4.1.3 Gradient with Memoryless Limiter

For memoryless limiter 702 shown in FIG. 8 the preprocessing function is $$f_T(x) = \begin{cases} -T & x < -T \\ x & -T \leq x \leq T, \\ T & x > T \end{cases} \quad \text{(Eq. 38)}$$

and the derivative with respect to T is $$\frac{\partial f_T(x)}{\partial T} = \begin{cases} -1 & x < -T \\ 0 & -T \le x \le T \\ 1 & x > T \end{cases} \quad \text{(Eq. 39)}$$

Combining Eqs. 37 and 39 provides the numerical gradient for the simple memoryless limiter at frame m:

$$\nabla_T(E_{\hat{S}}(m)) = \quad \text{(Eq. 40)}$$
$$-2\sum_f \text{Re}\left\{\hat{S}^*(m,f)\sum_{l=0}^{L} G_l(f) \cdot DFT\left\{\frac{\partial f_T(x(m-l,n))}{\partial T}, f\right\}\right\}.$$

From Eq. 39 it is evident that if all signal samples are within the saturation threshold of the limiter, i.e. in [−T;T], then the gradient will become zero, and effectively the adaptation will be stuck. To address this issue a slow decay of the saturation threshold can be incorporated for frames where the derivatives are all zero, and hence the complete update rule becomes $$T(m+1) = \begin{cases} \alpha \cdot T(m) & x(m,n) \in [-T(m); T(m)] \forall n \\ T(m) - \frac{1}{2}\mu \cdot (E_{\hat{S}}(m)) & \text{otherwise} \end{cases} \quad \text{(Eq. 41)}$$

Figure 11:
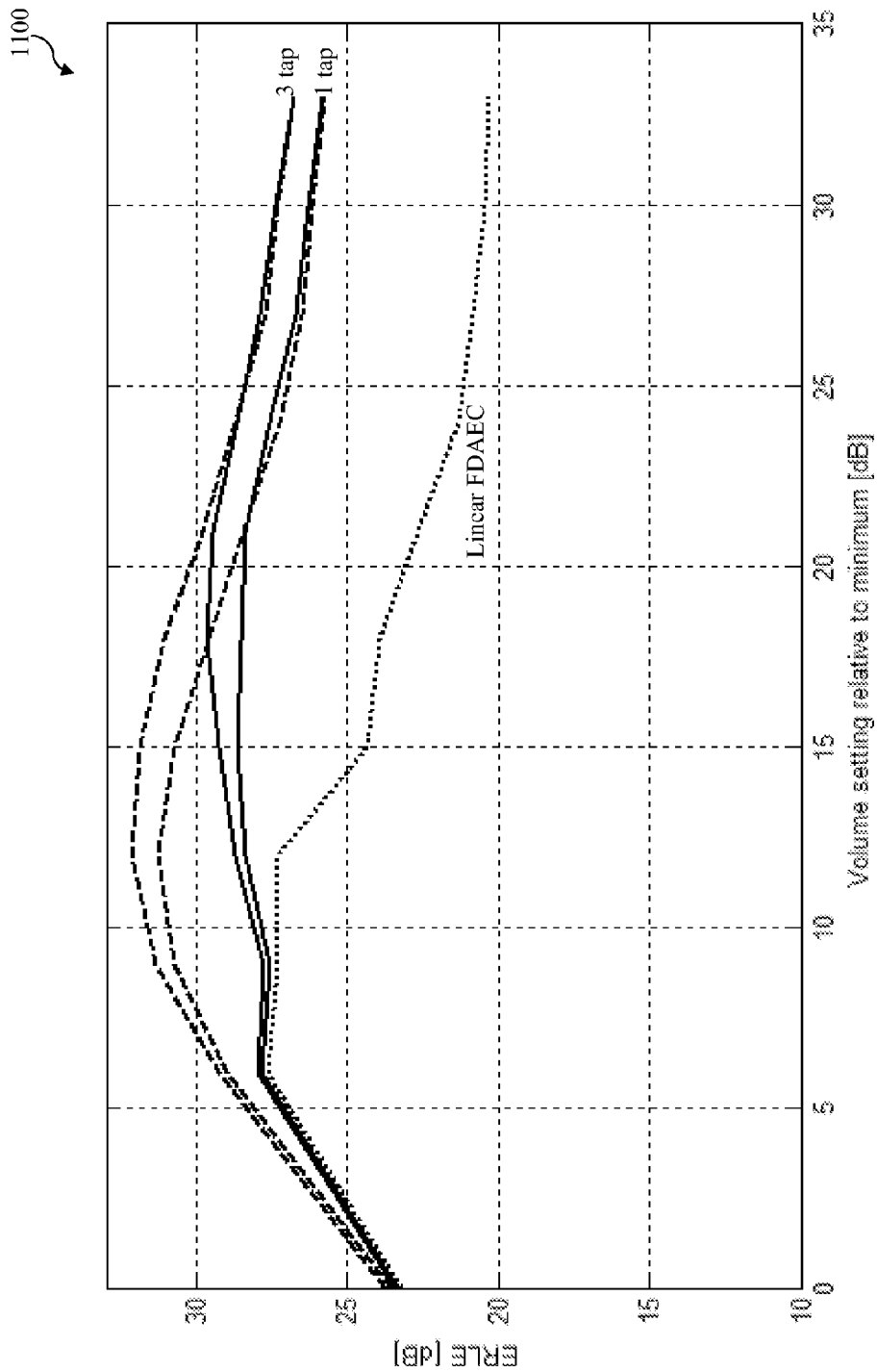
FIG. 11 depicts a graph showing the performance of different acoustic echo cancellations structures in accordance with various embodiments.

Repeating the equivalent simulations of FIG. 9, but with the fully adaptive saturation threshold provides the performance shown in graph 1100 of FIG. 11. Additionally, the plot includes performance for both non-hybrid (1 tap, i.e. L=0) and $2^{nd}$ order hybrid (3 taps, i.e., L=2). The solid curves are for the fixed −18 dB saturation threshold, while the dashed curves are with the steepest descent saturation threshold according to the above. In the experiments producing the performance plots of FIG. 11, the following settings were used:

$$\alpha = \frac{127}{128}, \mu = 0.002.$$

At high volume settings where non-linearities are typically most dominant the steepest descent method provides performance equivalent to the fixed optimal saturation threshold. Somewhat unexpectedly, it provides a significant improvement of up to 3.5 dB at low to medium volume settings. Intuitively, the fixed optimal threshold was set for high volume setting, and hence it may not be optimal for low to medium volume setting. However, it is surprising that there is that much to be gained at these lower volume settings. Perhaps there is notable non-linear coupling even at the lower volume settings.

Figure 12:
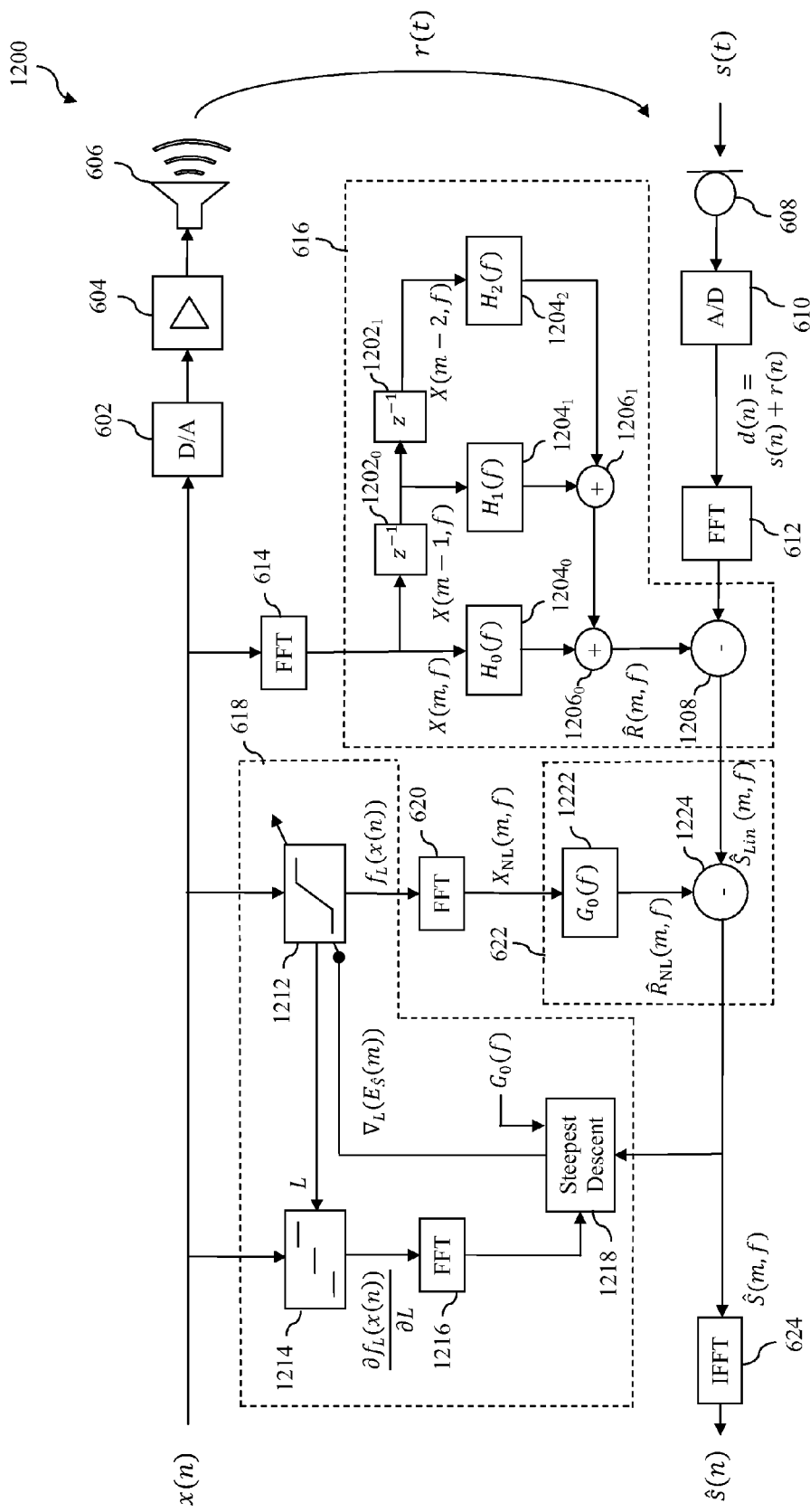
FIG. 12 is a block diagram of a non-linear acoustic echo canceller with a steepest descent adaptation of a preprocessing function.

FIG. 12 is block diagram of a system 1200 in which first FDAEC 616 is a $2^{nd}$ order hybrid FDAEC, second FDAEC 622 is a 0th order FDAEC, and preprocessor 618 includes a steepest descent adaptation of the preprocessing function, making it capable of cancelling non-linear coupling.

In accordance with system 1200 of FIG. 12, first FDAEC 616 receives a frequency domain representation of far-end speech signal x(n) for FFT frame m, denoted X(m, f), from FFT component 614. Each frequency sub-band or component of X(m, f) is passed through a corresponding time direction filter having a set of acoustic echo cancellation taps $H_0(f)$ through $H_2(f)$ (collectively denoted taps $1204_0$ through $1204_2$ in FIG. 12). A delay line comprising a plurality of delay elements $1202_0$ and $1202_1$ operates to produce the necessary time-delayed frequency components for each time direction filter. The outputs of taps $1204_0$ through $1204_2$ are summed by combiners $1206_0$ and $1206_1$ for each time direction filter, thereby producing an estimated linear acoustic echo signal in the frequency domain for FFT frame m, $\hat{R}(m, f)$. A combiner 1208 subtracts $\hat{R}(m, f)$ from the frequency domain representation of the microphone signal output by FFT component 612, thereby producing a first estimated near-end speech signal in the frequency domain for FFT frame m, denoted $\hat{S}_{Lin}(m, f)$. $\hat{S}_{Lin}(m, f)$ is then passed as an input to second FDAEC 622.

As further shown in FIG. 12, second FDAEC 622 receives a frequency domain representation of a non-linear acoustic echo reference signal for FFT frame m, denoted $X_{NL}(m, f)$, from FFT component 620. $X_{NL}(m, f)$ is passed to a filter 1222 that carries out the filtering of $X_{NL}(m, f)$ in the frequency domain by multiplying $X_{NL}(m, f)$ by $G_0(f)$, thereby producing an estimated non-linear acoustic echo signal in the frequency domain for FFT frame m, $\hat{R}_{NL}(m, f)$. A combiner 1224 subtracts $\hat{R}_{NL}(m, f)$ from $\hat{S}_{Lin}(m, f)$ thereby producing a second estimated near-end speech signal in the frequency domain for FFT frame m, $\hat{S}(m, f)$ is then passed to IFFT component 624 that operates to produce a time domain representation of $\hat{S}(m, f)$, which is $\hat{s}(n)$.

As also shown in FIG. 12, preprocessor 618 comprises a memoryless limiter 1212 as well as a number of other components that implement the aforementioned adaptive algorithm for estimating the saturation threshold of memoryless limiter 1212. In particular, a component 1214 operates to receive far-end speech signal x(n), the threshold of memoryless limiter L, and to generate the derivative of the far-end speech signal x(n) with respect to L, $$\frac{\partial f_L(x(n))}{\partial L}.$$

An FFT component 1216 converts $$\frac{\partial f_L(x(n))}{\partial L}$$

into the frequency domain and passes the frequency domain representation to component 1218. Component 1218 combines the frequency domain representation of $$\frac{\partial f_L(x(n))}{\partial L}$$

with the filter tap $G_0(f)$ to obtain a gradient $\nabla_L(E_{\hat{S}}(m))$. Component 1218 passes gradient $\nabla_L(E_{\hat{S}}(m))$ to memoryless limiter 1212, which uses the gradient to adjust the threshold L.

2.4.1.4 Gradient with Memoryless Soft Limiter

In B. S. Nollett, D. L. Jones, "Nonlinear Echo Cancellation for Hands-free Speakerphones," Proc. NSIP, 1997, Mackinac Island, Mich., USA, September 1997 (the entirety of which is incorporated by reference herein), a soft limiter is proposed (for a different structure) given by $$f_{\alpha,T}(x) = \frac{T \cdot x}{\sqrt[\alpha]{|T|^\alpha + |x|^\alpha}}, \quad \text{(Eq. 42)}$$

This can be used as the non-linear preprocessing function. Similar to the hard limiter described above it saturates the output at T. The parameter, $\alpha$, controls how hard the saturation is. For $\alpha=2$ it simplifies to $$f_T(x) = \frac{T \cdot x}{\sqrt{T^2 + x^2}}, \quad \text{(Eq. 43)}$$

and the derivative with respect to T is $$\frac{\partial f_T(x)}{\partial T} = \frac{x^3}{(T^2 + x^2)^{3/2}}. \quad \text{(Eq. 44)}$$

The gradient can be calculated according to Eq. 40, and the update rule becomes $$T(m+1) = T(m) - \frac{1}{2}\mu \cdot \nabla_T(E_{\hat{S}}(m)). \quad \text{(Eq. 45)}$$

It should be noted that no special treatment is necessary since there is no trap with a trivial gradient of zero as was seen for the hard limiter.

2.4.1.5 Gradient with Memoryless General Soft Limiter

Figure 13:
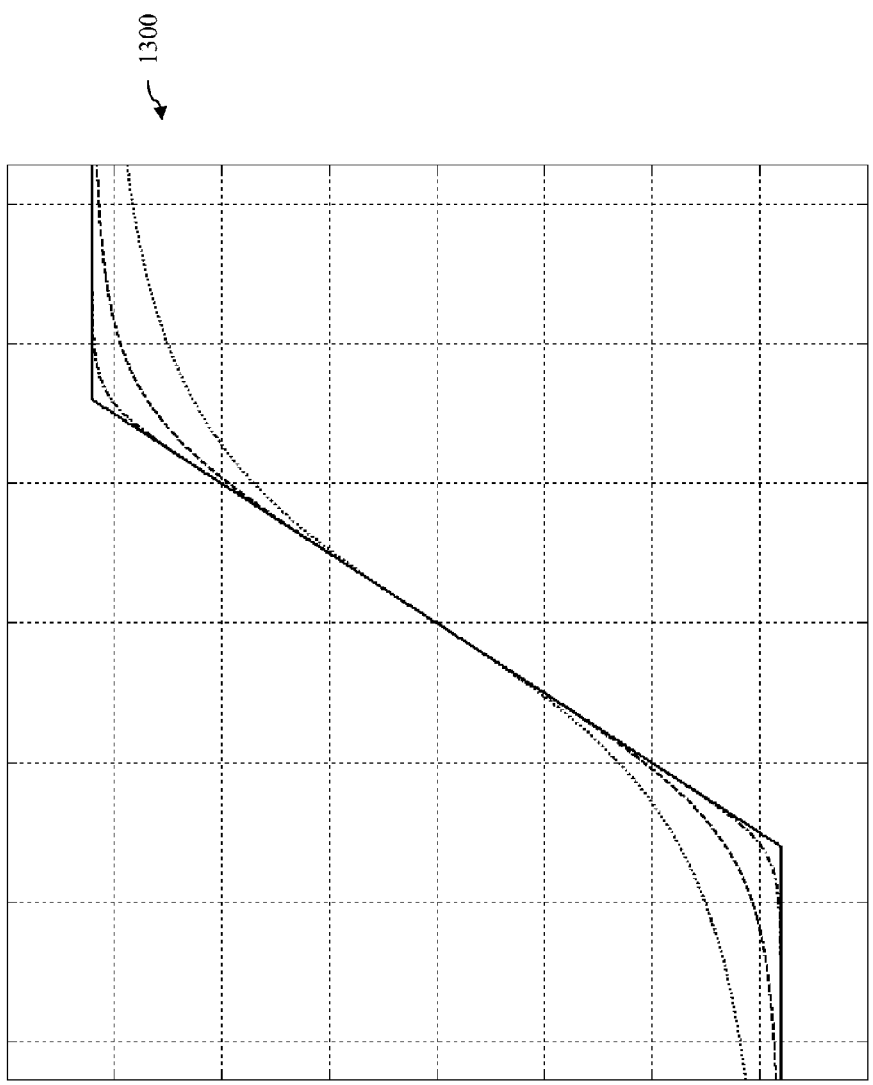
FIG. 13 depicts a diagram that illustrates plots of various example non-linear preprocessing functions in accordance with certain embodiments.

In Section 2.4.1.4 the gradient and update rule for the special case ($\alpha=2$) of the general non-linear preprocessing function of Eq. 42 was derived. However, to further facilitate modeling of non-linear coupling both T and $\alpha$ can be adaptive parameters. Diagram 1300 in FIG. 13 shows plots of non-linear preprocessing functions such as the hard limiter, the soft limiter with $\alpha=2$, as well as various other values of $\alpha$.

As can be seen from the plot the parameter $\alpha$ controls the degree of non-linearity. Making both parameters adaptive further complicates matters and requires the partial gradients with respect to both parameters to be derived. From Eq. 37:

$$\nabla_T(E_{\hat{S}}(m)) = \quad \text{(Eq. 46)}$$
$$-2\sum_f \text{Re}\left\{\hat{S}^*(m,f)\sum_{l=0}^{L} G_l(f) \cdot DFT\left\{\frac{\partial f_{\alpha,T}(x(m-l,n))}{\partial T}, f\right\}\right\}$$

$$\nabla_\alpha(E_{\hat{S}}(m)) =$$
$$-2\sum_f \text{Re}\left\{\hat{S}^*(m,f)\sum_{l=0}^{L} G_l(f) \cdot DFT\left\{\frac{\partial f_{\alpha,T}(x(m-l,n))}{\partial \alpha}, f\right\}\right\}.$$

Hence, the partial derivatives of $f_{\alpha,T}(x)$ with respect to T and $\alpha$ are required. By using the quotient rule and the derivative of absolute value $$\frac{\partial |h(x)|}{\partial x} = \frac{h(x)}{|h(x)|}\frac{\partial h(x)}{\partial x} \quad \text{(Eq. 47)}$$

the derivative with respect to T is derived $$\frac{\partial f_{\alpha,T}(x)}{\partial T} = \frac{x(|T|^\alpha + |x|^\alpha)^{1/\alpha} - Tx\frac{\partial}{\partial T}(|T|^\alpha + |x|^\alpha)^{1/\alpha}}{(|T|^\alpha + |x|^\alpha)^{2/\alpha}} \quad \text{(Eq. 48)}$$

$$= \frac{x(|T|^\alpha + |x|^\alpha)^{1/\alpha} - Tx\alpha\frac{T}{|T|}|T|^{\alpha-1}\frac{1}{\alpha}(|T|^\alpha + |x|^\alpha)^{1/\alpha-1}}{(|T|^\alpha + |x|^\alpha)^{2/\alpha}}$$

$$= \frac{x(|T|^\alpha + |x|^\alpha)^{1/\alpha} - xT^2|T|^{\alpha-2}(|T|^\alpha + |x|^\alpha)^{1/\alpha-1}}{(|T|^\alpha + |x|^\alpha)^{2/\alpha}}$$

$$= \frac{x(|T|^\alpha + |x|^\alpha - T^2|T|^{\alpha-2})}{(|T|^\alpha + |x|^\alpha)^{1+1/\alpha}}$$

$$= \frac{x|x|^\alpha}{(|T|^\alpha + |x|^\alpha)^{1+1/\alpha}}$$

By inserting $\alpha=2$ it can be seen to reduce to the special case of Eq. 44. Using the quotient rule and the generalized power rule, the derivative of the preprocessing function with respect to $\alpha$ is derived as $$\frac{\partial f_{\alpha,T}(x)}{\partial \alpha} = -Tx\frac{\frac{\partial}{\partial \alpha}(|T|^\alpha + |x|^\alpha)^{1/\alpha}}{(|T|^\alpha + |x|^\alpha)^{2/\alpha}} \quad \text{(Eq. 49)}$$

$$= -Tx\frac{x(|T|^\alpha + |x|^\alpha)^{1/\alpha}[(|T|^\alpha \ln(|T|) + |x|^\alpha \ln(|x|))\frac{\alpha^{-1}}{|T|^\alpha + |x|^\alpha} - \alpha^{-2}\ln(|T|^\alpha + |x|^\alpha)]}{(|T|^\alpha + |x|^\alpha)^{2/\alpha}}$$

$$= Tx\frac{(|T|^\alpha + |x|^\alpha)\ln(|T|^\alpha + |x|^\alpha) - \alpha(|T|^\alpha \ln(|T|) + |x|^\alpha \ln(|x|))}{\alpha^2(|T|^\alpha + |x|^\alpha)^{1+1/\alpha}}$$

$$= Tx\frac{(|T|^\alpha + |x|^\alpha)\ln(|T|^\alpha + |x|^\alpha) - |T|^\alpha \ln(|T|^\alpha) - |x|^\alpha \ln(|x|^\alpha)}{\alpha^2(|T|^\alpha + |x|^\alpha)^{1+1/\alpha}}.$$

The update rule of the gradient descent algorithm for the two parameters of the general soft limiter is then given by $$T(m+1) = T(m) - \frac{1}{2}\mu_T \cdot \nabla_T(E_{\hat{S}}(m)) \quad \text{(Eq. 50)}$$

$$\alpha(m+1) = \alpha(m) - \frac{1}{2}\mu_\alpha \cdot \nabla_\alpha(E_{\hat{S}}(m)).$$

2.5 Updating of Statistics for Non-Linear AEC

The preceding section described a two-stage structure in which a first FDAEC is used to attenuate or cancel linear acoustic echo components of a microphone signal to generate an output signal and a second FDAEC is used to attenuate or cancel non-linear acoustic echo components of the output signal generated by the first FDAEC. In accordance with one embodiment, the techniques described in Section 2.2 above are used to update the estimated signal statistics used to implement the first FDAEC. In a further embodiment, somewhat similar techniques are used to update the estimated signal statistics used to implement the second FDAEC. The techniques used to update the estimated signal statistics used to implement the second FDAEC in accordance with one example embodiment will now be described.

In accordance with the example embodiment, a rate for updating the estimated statistics necessary for implementing the second FDAEC are controlled on a frequency bin by frequency bin basis in accordance with a measure of coherence between the frequency domain representation of the signal output by the preprocessing function and the signal being output by the first FDAEC. In one embodiment, the measure of coherence for each frequency bin is determined by calculating the squared magnitude of the normalized cross-spectrum between the signal output by the preprocessing function and the signal output by the first FDAEC. However, this is only one example, and other methods for determining the measure of coherence on a frequency bin by frequency bin basis may be used.

In accordance with certain embodiments, an aggressive tracker is utilized that maps a high measure of coherence to a fast update rate for the estimated statistics and maps a low measure of coherence to a low update rate for the estimated statistics, which may include not updating at all. In an embodiment in which the statistics are estimated by calculating a running mean, the aforementioned mapping may be achieved by controlling the weight attributed to the current instantaneous statistics when calculating the mean. Thus, to achieve a slow update rate, little or no weight may be assigned to the current instantaneous statistics, but to achieve a fast update rate, more significant weight may be assigned current instantaneous statistics. For each frequency bin, the result of the application of the closed-form solution of the acoustic echo canceller is determined in accordance with the estimated statistics generated using the aggressive tracker. Furthermore, a "safety net" may be applied to each frequency bin such that if the selected result for that frequency bin has a power that is greater than that of the corresponding frequency bin of the signal output by the first FDAEC, then the selected result may be discarded and the frequency component associated with the signal output by the first FDAEC may be used instead. This can help avoid the introduction of distortion by the second FDAEC and avoid divergence.

Figure 14:
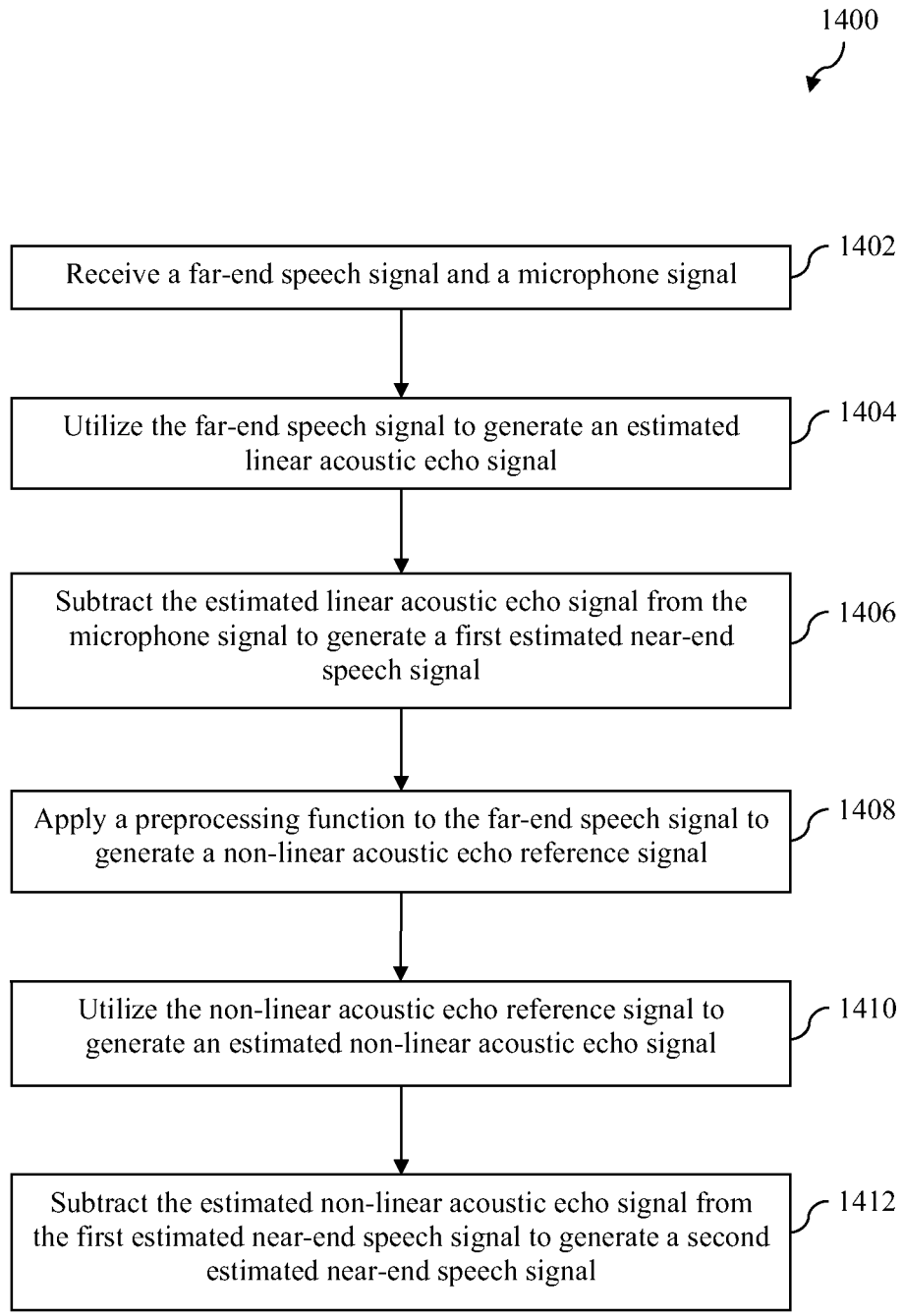
FIG. 14 is a flowchart of a practical method for performing acoustic echo cancellation.

2.6 Exemplary Methods for Performing Practical Non-Linear Acoustic Echo Cancellation FIG. 14 depicts a flowchart 1400 of an exemplary method for performing acoustic echo cancellation using a structure such as that described above in reference to system 600 of FIG. 6. However, the method is not limited to that implementation and may be implemented using other structures as well.

The method of flowchart 1400 begins at step 1402, in which a far-end speech signal and a microphone signal are received. In example system 600 of FIG. 6, this step maybe performed by first FDAEC 616 which operates to receive the frequency domain representation of far-end speech signal x(n) generated by FFT component 614 and the frequency domain representation of the microphone signal generated by FFT component 612. Although FIG. 6 shows the far-end speech signal as a digital signal that is passed to D/A converter 602 and that is converted into the frequency domain by FFT component 614, the term "far-end speech signal" is to be broadly construed to encompass any speech signal received from a far end in an audio communication system, regardless of whether such signal is in analog or digital form and regardless of whether such signal has been processed after it is received from the far end. Furthermore, although FIG. 6 shows the microphone signal as a digital signal output by A/D converter 610 and converted into the frequency domain by FFT component 612, the term "microphone signal" is to be broadly construed to encompass any audio signal originating from a microphone, regardless of whether such signal is in digital or analog form and regardless of whether such signal has been processed after it is generated by the microphone.

At step 1404, the far-end speech signal is utilized to generate an estimated linear acoustic echo signal. In example system 600 of FIG. 6, this step may also be performed by first FDAEC 616, which operates to utilize the frequency domain representation of x(n) as a reference signal for obtaining an estimated linear acoustic echo signal.

At step 1406, the estimated linear acoustic echo signal is subtracted from the microphone signal to generate a first estimated near-end speech signal. In example system 600 of FIG. 6, this step may also be performed by first FDAEC 616, which subtracts the estimated linear acoustic echo signal from the microphone signal in the frequency domain, thereby generating a first estimated near-end speech signal.

At step 1408, a preprocessing function is applied to the far-end speech signal to generate a non-linear acoustic echo reference signal. In example system 600 of FIG. 6, this step may be performed by preprocessor 618, which operates to apply a preprocessing function $f_b(\cdot)$ to far-end speech signal x(n) to generate a non-linear acoustic echo reference signal. As shown in FIG. 7, this step may also be performed by a memoryless limiter 702. As also discussed above, in certain embodiments, the preprocessing function that is applied to the far-end speech signal may be an adaptive preprocessing function. For example, as discussed above in reference to system 1200 of FIG. 12, preprocessor 618 may apply a steepest descent adaptation of a preprocessing function.

At step 1410, the non-linear acoustic echo reference signal is utilized to generate an estimated non-linear acoustic echo signal. In example system 600 of FIG. 6, this step may be performed by second FDAEC 622 which utilizes a frequency domain representation of the non-linear acoustic echo reference signal to obtain an estimated non-linear acoustic echo signal.

At step 1412, the estimated non-linear acoustic echo signal is subtracted from the first estimated near-end speech signal to generate a second estimated near-end speech signal. In example system 600 of FIG. 6, this step may also be performed by second FDAEC 622, which subtracts the estimated non-linear acoustic echo signal from the first estimated near-end speech signal output by first FDAEC 616 in the frequency domain, thereby generating a second estimated near-end speech signal.

In one embodiment, step 1404 comprises generating the estimated linear acoustic echo signal by filtering the far-end speech signal with a filter that is determined from estimated statistics associated with the far-end speech signal and the microphone signal.

In an alternate embodiment, step 1404 comprises generating the estimated linear acoustic echo signal by passing each of a plurality of frequency components of a frequency domain representation of the far-end speech signal through a respective one of a plurality of time direction filters, wherein the filter taps associated with each time direction filter are determined from estimated statistics associated with the far-end speech signal and the microphone signal.

In another embodiment, step 1410 comprises generating the estimated non-linear acoustic echo signal by filtering the non-linear acoustic echo reference signal with a filter that is determined from estimated statistics associated with the non-linear acoustic echo reference signal and the first estimated near-end speech signal. It is to be understood that the filtering described in this step may comprise either convolution in the time domain with the impulse response or multiplication in the frequency domain with the frequency domain representation of the impulse response.

In a further embodiment, step 1410 comprises generating the estimated non-linear acoustic echo signal by passing each of a plurality of frequency components of a frequency domain representation of the non-linear acoustic echo reference signal through a respective one of a plurality of time direction filters, wherein the filter taps associated with each time direction filter are determined from estimated statistics associated with the non-linear acoustic echo reference signal and the first estimated near-end speech signal.

In certain embodiments, step 1404 comprises generating the estimated linear acoustic echo signal based at least in part on statistics associated with the far-end speech signal and the microphone signal. In further accordance with such embodiments, the statistics may be updated at a rate determined at least in accordance with a measure of coherence between the far-end speech signal and the microphone signal. The update rate may be determined on a frequency bin basis based on a measure of coherence between the far-end speech signal and the microphone signal for each frequency bin.

In another embodiment, step 1404 and step 1406 comprise: (i) generating a first estimated linear acoustic echo signal based at least in part on statistics associated with the far-end speech signal and the microphone signal that are updated in accordance with an adaptive update rate; (ii) generating a first signal by subtracting the first estimated linear acoustic echo signal from the microphone signal; (iii) generating a second estimated linear acoustic echo signal based at least in part on statistics associated with the far-end speech signal and the microphone signal that are updated in accordance with a fixed update rate; (iv) generating a second signal by subtracting the second estimated linear acoustic echo signal from the microphone signal; and (v) generating the first estimated near-end speech signal by selecting for each of a plurality of frequency bins a lower-power frequency component from among a frequency component of the first signal and a frequency component of the second signal.

In a further embodiment, step 1406 comprises generating a first signal by subtracting the first estimated linear acoustic echo signal from the microphone signal and generating the first estimated near-end speech signal by selecting for each of a plurality of frequency bins a lower-power frequency component from among a frequency component of the first signal and a frequency component of the microphone signal.

In certain embodiments, step 1410 comprises generating the estimated non-linear acoustic echo signal based at least in part on statistics associated with the non-linear acoustic echo reference signal and the first estimated near-end speech signal. In further accordance with such embodiments, the statistics may be updated at a rate determined at least in accordance with a measure of coherence between the non-linear acoustic echo reference signal and the first estimated near-end speech signal. The update rate may be determined on a frequency bin basis based on a measure of coherence between the non-linear acoustic echo reference signal and the first estimated near-end speech signal for each frequency bin.

In another embodiment, step 1410 and step 1412 comprise: (i) generating a first estimated non-linear acoustic echo signal based at least in part on statistics associated with the non-linear acoustic echo reference signal and the first estimated near-end speech signal that are updated in accordance with an adaptive update rate; (ii) generating a first signal by subtracting the first estimated non-linear acoustic echo signal from the first estimated near-end speech signal; (iii) generating a second estimated non-linear acoustic echo signal based at least in part on statistics associated with the non-linear acoustic echo reference signal and the first estimated near-end speech signal that are updated in accordance with a fixed update rate; (iv) generating a second signal by subtracting the second estimated non-linear acoustic echo signal from the first estimated near-end speech signal; and (v) generating the second estimated near-end speech signal by selecting for each of a plurality of frequency bins a lower-power frequency component from among a frequency component of the first signal and a frequency component of the second signal.

In a further embodiment, step 1412 comprises generating a first signal by subtracting the estimated non-linear acoustic echo signal from the first estimated near-end speech signal and generating the second estimated near-end speech signal by selecting for each of a plurality of frequency bins a lower-power frequency component from among a frequency component of the first signal and a frequency component of the first estimated near-end speech signal.

3. Example Computer System Implementation

Each of the systems and methods described above may be implemented in hardware, by software executed by a processing unit, or by a combination thereof In particular, each of systems 100, 200, 300, 400, 500, 600, 700, 800, 1000 and 1200 and each of the steps of flowchart 1400 may be implemented in hardware, by software executed by a processing unit, or by a combination thereof.

Where elements or steps described herein are implemented by software executed by a processing unit, such elements or steps may be implemented by one or more processor-based computer systems. An example of such a computer system 1500 is depicted in FIG. 15.

Figure 15:
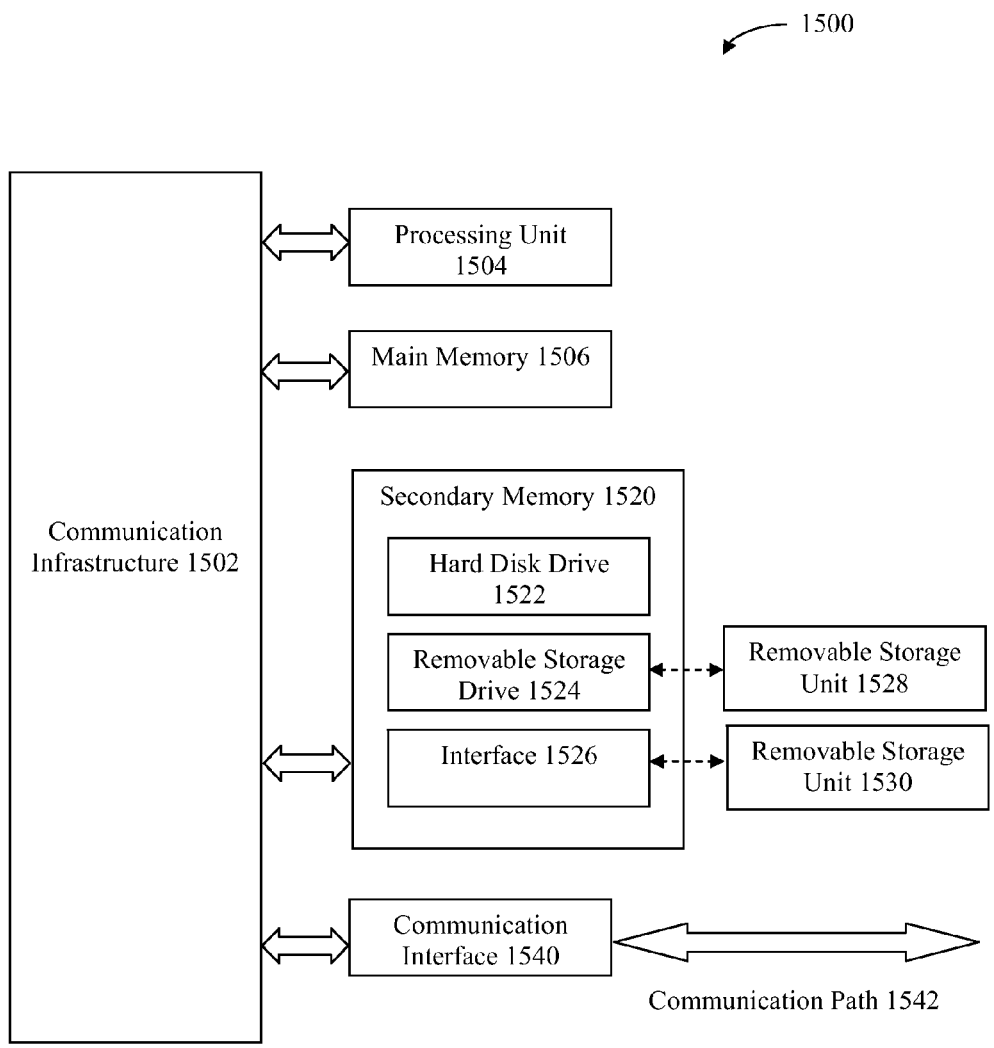
FIG. 15 depicts an example computer system that may be used to implement certain embodiments.

As shown in FIG. 15, computer system 1500 includes a processing unit 1504 that includes one or more processors or processor cores. Processor unit 1504 is connected to a communication infrastructure 1502, which may comprise, for example, a bus or a network.

Computer system 1500 also includes a main memory 1506, preferably random access memory (RAM), and may also include a secondary memory 1520. Secondary memory 1520 may include, for example, a hard disk drive 1522, a removable storage drive 1524, and/or a memory stick. Removable storage drive 1524 may comprise a floppy disk drive, a magnetic tape drive, an optical disk drive, a flash memory, or the like. Removable storage drive 1524 reads from and/or writes to a removable storage unit 1528 in a well-known manner. Removable storage unit 1528 may comprise a floppy disk, magnetic tape, optical disk, or the like, which is read by and written to by removable storage drive 1524. As will be appreciated by persons skilled in the relevant art(s), removable storage unit 1528 includes a computer-readable storage medium having stored therein computer software and/or data.

In alternative implementations, secondary memory 1520 may include other similar means for allowing computer programs or other instructions to be loaded into computer system 1500. Such means may include, for example, a removable storage unit 1530 and an interface 1526. Examples of such means may include a program cartridge and cartridge interface (such as that found in video game devices), a removable memory chip (such as an EPROM, or PROM) and associated socket, and other removable storage units 1530 and interfaces 1526 which allow software and data to be transferred from the removable storage unit 1530 to computer system 1500.

Computer system 1500 may also include a communication interface 1540. Communication interface 1540 allows software and data to be transferred between computer system 1500 and external devices. Examples of communication interface 1540 may include a modem, a network interface (such as an Ethernet card), a communications port, a PCM-CIA slot and card, or the like. Software and data transferred via communication interface 1540 are in the form of signals which may be electronic, electromagnetic, optical, or other signals capable of being received by communication interface 1540. These signals are provided to communication interface 1540 via a communication path 1542. Communications path 1542 carries signals and may be implemented using wire or cable, fiber optics, a phone line, a cellular phone link, an RF link and other communications channels.

As used herein, the terms "computer program medium" and "computer readable medium" are used to generally refer to non-transitory media such as removable storage unit 1528, removable storage unit 1530 and a hard disk installed in hard disk drive 1522. Computer program medium and computer readable medium can also refer to non-transitory memories, such as main memory 1506 and secondary memory 1520, which can be semiconductor devices (e.g., DRAMs, etc.). These computer program products are means for providing software to computer system 1500.

Computer programs (also called computer control logic, programming logic, or logic) are stored in main memory 1506 and/or secondary memory 1520. Computer programs may also be received via communication interface 1540. Such computer programs, when executed, enable the computer system 1500 to implement features of the various embodiments discussed herein. Accordingly, such computer programs represent controllers of the computer system 1500. Where an embodiment is implemented using software, the software may be stored in a computer program product and loaded into computer system 1500 using removable storage drive 1524, interface 1526, or communication interface 1540.

The embodiments described herein are also directed to computer program products comprising software stored on any computer readable medium. Such software, when executed in one or more data processing devices, causes a data processing device(s) to operate as described herein. Embodiments described herein may employ any computer readable medium, known now or in the future. Examples of computer readable mediums include, but are not limited to, primary storage devices (e.g., any type of random access memory) and secondary storage devices (e.g., hard drives, floppy disks, CD ROMs, zip disks, tapes, magnetic storage devices, optical storage devices, MEMs, nanotechnology-based storage device, etc.).

4. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims.

For example, the present invention has been described above with the aid of functional building blocks and method steps illustrating the performance of specified functions and relationships thereof. The boundaries of these functional building blocks and method steps have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like or any combination thereof. Thus, the breadth and scope of the present invention should not be limited by any of the above-described exemplary embodiments, but should be defined only in accordance with the following claims and their equivalents.

What is claimed is:

1. An echo cancellation system, comprising:
a first echo canceller that is operable to receive a far-end audio signal and a microphone signal, to utilize the far-end audio signal to generate an estimated linear echo signal, and to subtract the estimated linear echo signal from the microphone signal to generate a first estimated near-end audio signal;
a preprocessor operable to apply an adaptive time domain preprocessing function to the far-end audio signal to generate a non-linear echo reference signal; and
a second echo canceller that is operable to receive the non-linear echo reference signal and the first estimated near-end audio signal, to utilize the non-linear echo reference signal to generate an estimated non-linear echo signal, and to subtract the estimated non-linear echo signal from the first estimated near-end audio signal to generate a second estimated near-end audio signal.

2. The system of claim 1, wherein the first echo canceller is operable to receive a frequency domain representation of the far-end audio signal and a frequency domain representation of the microphone signal and to generate a frequency domain representation of the first estimated near-end audio signal; and
wherein the second echo canceller is operable to receive the frequency domain representation of the first estimated near-end audio signal and a frequency domain representation of the non-linear echo reference signal and to generate a frequency domain representation of the second estimated near-end audio signal.

3. The system of claim 1, wherein the first echo canceller comprises a filter that filters the far-end audio signal to generate the estimated linear echo signal, the filter being determined from estimated statistics associated with the far-end audio signal and the microphone signal.

4. The system of claim 2, wherein the first echo canceller generates the estimated linear echo signal by passing each of a plurality of frequency components of the frequency domain representation of the far-end audio signal through a respective one of a plurality of time direction filters, wherein filter taps associated with each time direction filter are determined from estimated statistics associated with the far-end audio signal and the microphone signal.

5. The system of claim 1, wherein the second echo canceller comprises a filter that filters the non-linear echo reference signal to generate the estimated non-linear echo signal, the filter being determined from estimated statistics associated with the non-linear echo reference signal and the first estimated near-end audio signal.

6. The system of claim 2, wherein the second echo canceller generates the estimated non-linear echo signal by passing each of a plurality of frequency components of the frequency domain representation of the non-linear echo reference signal through a respective one of a plurality of time direction filters, wherein filter taps associated with each time direction filter are determined from estimated statistics associated with the non-linear echo reference signal and the first estimated near-end audio signal.

7. The system of claim 1, wherein the preprocessor comprises a memoryless limiter.

8. The system of claim 1, wherein the preprocessor is operable to apply a steepest descent adaptation of a preprocessing function to generate the non-linear echo reference signal.

9. The system of claim 1, wherein the first echo canceller is operable to generate the estimated linear echo signal based at least in part on statistics associated with the far-end audio signal and the microphone signal; and
wherein the first echo canceller is further operable to update the statistics at a rate determined at least in accordance with a measure of coherence between the far-end audio signal and the microphone signal.

10. The system of claim 1, wherein the first echo canceller is operable to:
generate a first estimated linear echo signal based at least in part on statistics associated with the far-end audio signal and the microphone signal that are updated in accordance with an adaptive update rate;
generate a first signal by subtracting the first estimated linear echo signal from the microphone signal;
generate a second estimated linear echo signal based at least in part on statistics associated with the far-end audio signal and the microphone signal that are updated in accordance with a fixed update rate;
generate a second signal by subtracting the second estimated linear echo signal from the microphone signal; and
generate the first estimated near-end audio signal by selecting for each of a plurality of frequency bins a frequency component from among a frequency component of the first signal and a frequency component of the second signal.

11. The system of claim 1, wherein the first echo canceller is operable to:
generate a first signal by subtracting the estimated linear echo signal from the microphone signal; and
generate the first estimated near-end audio signal by selecting for each of a plurality of frequency bins a frequency component from among a frequency component of the first signal and a frequency component of the microphone signal.

12. The system of claim 1, wherein the second echo canceller is operable to generate the estimated non-linear echo signal based at least in part on statistics associated with the non-linear echo reference signal and the first estimated near-end audio signal; and
wherein the second echo canceller is further operable to update the statistics at a rate determined at least in accordance with a measure of coherence between the non-linear echo reference signal and the first estimated near-end audio signal.

13. The system of claim 1, wherein the second echo canceller is operable to:
generate a first estimated non-linear echo signal based at least in part on statistics associated with the non-linear echo reference signal and the first estimated near-end audio signal that are updated in accordance with an adaptive update rate;
generate a first signal by subtracting the first estimated non-linear echo signal from the first estimated near-end audio signal;
generate a second estimated non-linear echo signal based at least in part on statistics associated with the non-linear echo reference signal and the first estimated near-end audio signal that are updated in accordance with a fixed update rate;
generate a second signal by subtracting the second estimated non-linear echo signal from the first estimated near-end audio signal; and
generate the second estimated near-end audio signal by selecting for each of a plurality of frequency bins a frequency component from among a frequency component of the first signal and a frequency component of the second signal.

14. The system of claim 1, wherein the second echo canceller is operable to:
generate a first signal by subtracting the estimated non-linear echo signal from the first estimated near-end audio signal; and
generate the second estimated near-end audio signal by selecting for each of a plurality of frequency bins a frequency component from among a frequency component of the first signal and a frequency component of the first estimated near-end audio signal.

15. A method for performing echo cancellation, comprising:
receiving a far-end audio signal and a microphone signal;
utilizing the far-end audio signal to generate an estimated linear echo signal;
subtracting the estimated linear echo signal from the microphone signal to generate a first estimated near-end audio signal;
applying a preprocessing function in the time domain to the far-end audio signal to generate a non-linear echo reference signal;
utilizing the non-linear echo reference signal to generate an estimated non-linear echo signal in the frequency domain; and
subtracting the estimated non-linear echo signal from the first estimated near-end audio signal to generate a second estimated near-end audio signal.

16. The method of claim 15, wherein applying the preprocessing function to the far-end audio signal comprises passing the far-end audio signal through a memoryless limiter.

17. The method of claim 15, wherein applying the preprocessing function to the far-end audio signal comprises applying an adaptive preprocessing function to the far-end audio signal.

18. The method of claim 17, wherein applying the adaptive preprocessing function to the far-end audio signal further comprises performing a steepest descent adaptation of the preprocessing function.

19. A computer program product comprising a computer-readable storage device having computer logic recorded thereon, the computer logic being executable by a processing unit to cause the processing unit to perform steps comprising:
receiving a far-end audio signal and a microphone signal;
utilizing the far-end audio signal to generate an estimated linear echo signal;
subtracting the estimated linear echo signal from the microphone signal to generate a first estimated near-end audio signal;
applying an adaptive preprocessing function that includes passing the far-end audio signal through a memoryless limiter to the far-end audio signal to generate a non-linear echo reference signal;
utilizing the non-linear echo reference signal to generate an estimated non-linear echo signal; and subtracting the estimated non-linear echo signal from the first output signal to generate a second estimated near-end audio signal.

20. The computer program product of claim 19, wherein applying the adaptive preprocessing function further comprises performing a steepest descent adaptation of the preprocessing function.

* * * * *